(12) United States Patent
Oddsen, Jr. et al.

(10) Patent No.: US 7,066,435 B2
(45) Date of Patent: Jun. 27, 2006

(54) UNIVERSAL WALL MOUNTING BRACKET

(75) Inventors: Odd N. Oddsen, Jr., Easton, PA (US); Bradley A. Derry, Allentown, PA (US)

(73) Assignee: Innovation Office Products, Inc., Easton, PA (US)

( * ) Notice: Subject to any disclaimer, the term of this patent is extended or adjusted under 35 U.S.C. 154(b) by 41 days.

(21) Appl. No.: 10/728,305

(22) Filed: Dec. 4, 2003

(65) Prior Publication Data

US 2005/0121577 A1  Jun. 9, 2005

(51) Int. Cl.
*E04G 3/00* (2006.01)

(52) U.S. Cl. ............ 248/220.43; 248/220.41; 248/220.31; 248/276.1; 248/917

(58) Field of Classification Search ......... 248/276.1, 248/282.1, 917, 919, 921, 922, 220.31, 220.41, 248/220.43
See application file for complete search history.

(56) References Cited

U.S. PATENT DOCUMENTS

| | | | |
|---|---|---|---|
| 2,144,602 A | | 1/1939 | Balmer |
| 2,191,701 A | * | 2/1940 | Wood .................. 248/245 |
| 3,039,727 A | | 6/1962 | Engel, Jr. et al. |
| 3,243,153 A | | 3/1966 | Kelly et al. |
| 3,829,050 A | | 8/1974 | Brautaset et al. |
| 4,386,500 A | * | 6/1983 | Sigafoose .................. 62/79 |
| 4,607,753 A | | 8/1986 | Radek |
| 4,662,593 A | | 5/1987 | Shames et al. |
| 4,678,151 A | | 7/1987 | Radek |
| 4,684,094 A | | 8/1987 | Everett |
| 4,729,533 A | | 3/1988 | Hillary et al. |
| 4,747,025 A | | 5/1988 | Barton |
| 5,185,971 A | | 2/1993 | Johnson, Jr. |
| 5,255,803 A | * | 10/1993 | Pavone et al. .............. 211/189 |
| 5,356,104 A | | 10/1994 | Rosenberg et al. |
| 5,412,912 A | | 5/1995 | Alves |
| 5,535,972 A | | 7/1996 | Fallago |
| 5,797,568 A | | 8/1998 | Canton Gongora et al. |
| 5,813,641 A | | 9/1998 | Baldwin |
| 5,820,091 A | | 10/1998 | Kutscher |
| 5,842,672 A | | 12/1998 | Sweere et al. |
| 5,918,841 A | | 7/1999 | Sweere et al. |
| 5,947,429 A | | 9/1999 | Sweere et al. |
| 5,967,479 A | | 10/1999 | Sweere et al. |

(Continued)

OTHER PUBLICATIONS

"Plum flat screen arms provide ergonomic viewing positions," retrieved from the Internet on Aug. 8, 2003, <URL://www.lesco.co.uk/html_files/catalogue_pages/ergonomics/flat-screen_arms2.htm>; 2 pages.

(Continued)

*Primary Examiner*—Ramon O. Ramirez
*Assistant Examiner*—Steven Marsh
(74) *Attorney, Agent, or Firm*—Lerner, David, Littenberg, Krumholz & Mentlik, LLP

(57) ABSTRACT

A wall mount assembly is provided for attaching an electronic device to a slat wall. The wall mount assembly includes a main body, a mount and a pair of clip assemblies to connect to the slat wall. The mount has a central opening to receive a support arm that holds the electronic device. The clip assemblies may be spaced apart on arms attached to the main body. The arms and main body are dimensioned so that electrical cables connected to the electronic device can be passed between the main body and the slat wall, providing cable management. Furthermore, a wall mount assembly kit may include assorted clips or brackets for attaching to different slat wall configurations.

35 Claims, 25 Drawing Sheets

U.S. PATENT DOCUMENTS

| | | | |
|---|---|---|---|
| 5,996,264 A * | 12/1999 | Nagel | 40/649 |
| 6,119,878 A | 9/2000 | Zen | |
| 6,199,705 B1 | 3/2001 | Portner | |
| 6,266,250 B1 | 7/2001 | Foye | |
| 6,289,618 B1 * | 9/2001 | Kump et al. | 40/657 |
| 6,325,223 B1 | 12/2001 | Hannen | |
| 6,349,909 B1 * | 2/2002 | Zarrow et al. | 248/220.41 |
| 6,491,172 B1 | 12/2002 | Chance et al. | |
| 6,547,086 B1 | 4/2003 | Harvey | |
| 6,561,474 B1 | 5/2003 | Walter et al. | |
| 6,564,949 B1 | 5/2003 | Saathoff | |
| 6,578,498 B1 | 6/2003 | Draudt et al. | |
| 6,601,808 B1 * | 8/2003 | Nagel | 248/220.31 |
| 6,604,637 B1 * | 8/2003 | Lane et al. | 211/59.1 |
| 6,698,124 B1 * | 3/2004 | Kump et al. | 40/642.02 |
| 6,705,387 B1 * | 3/2004 | Kokubunji et al. | 165/67 |
| 6,758,454 B1 * | 7/2004 | Smed | 248/314 |
| 6,773,080 B1 * | 8/2004 | Chen et al. | 312/265.1 |
| 2002/0056541 A1 * | 5/2002 | Kokubunji et al. | |

OTHER PUBLICATIONS

"Slatwall Mount Model 8079-35 installation instructions," retrieved from the Internet on Mar. 1, 2004, <URL://www.lcdarms.com/Inst8079-35.pdf>; 2 pages.

"Flat screen arms—wishbone," colebrook bosson saunders, Nov. 2000; 13 pages.

"Spacedec Technical Specifications—swing arm," ATDEC, copyright Jun. 2003; 4 pages.

* cited by examiner

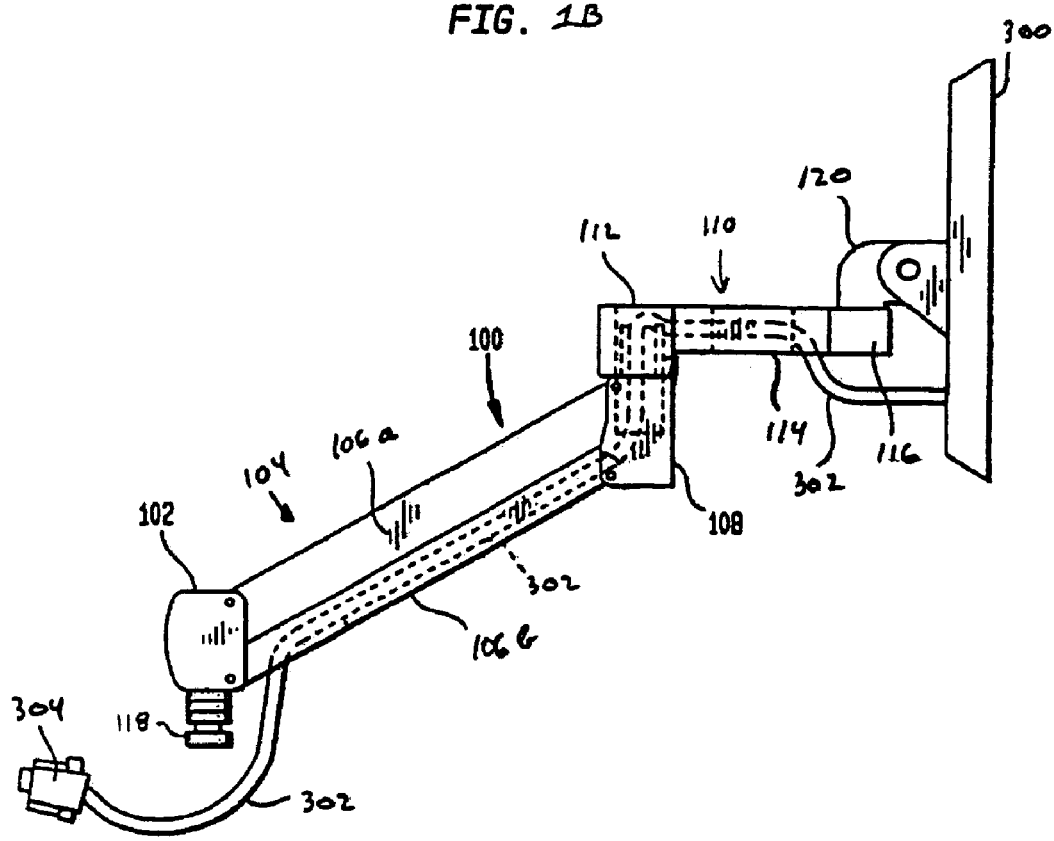

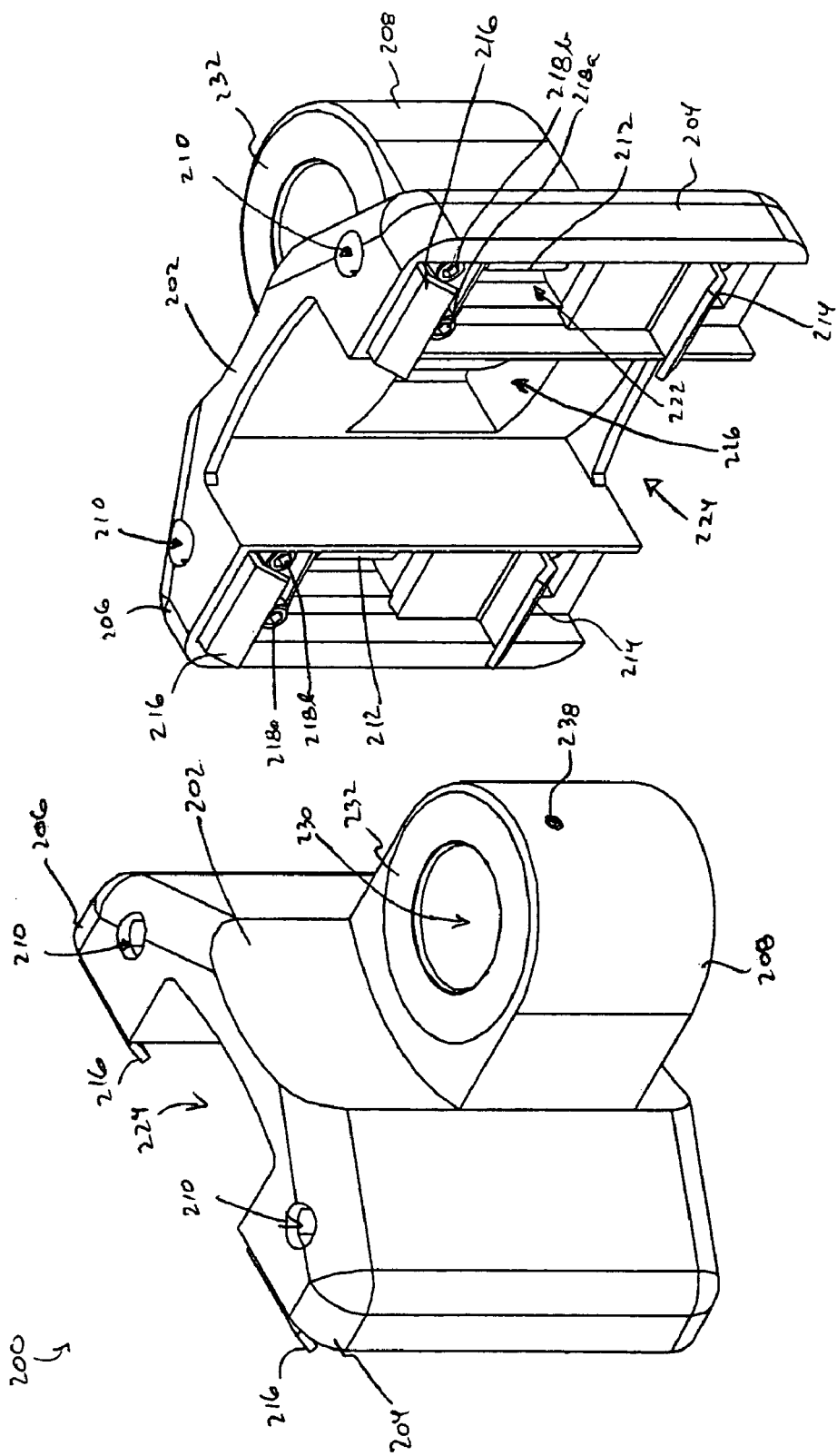

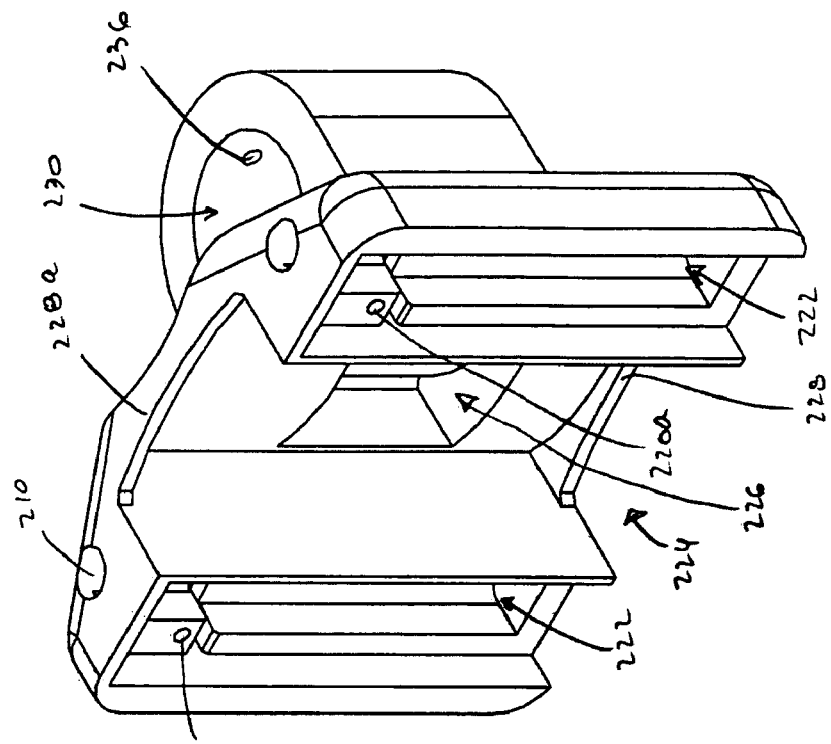
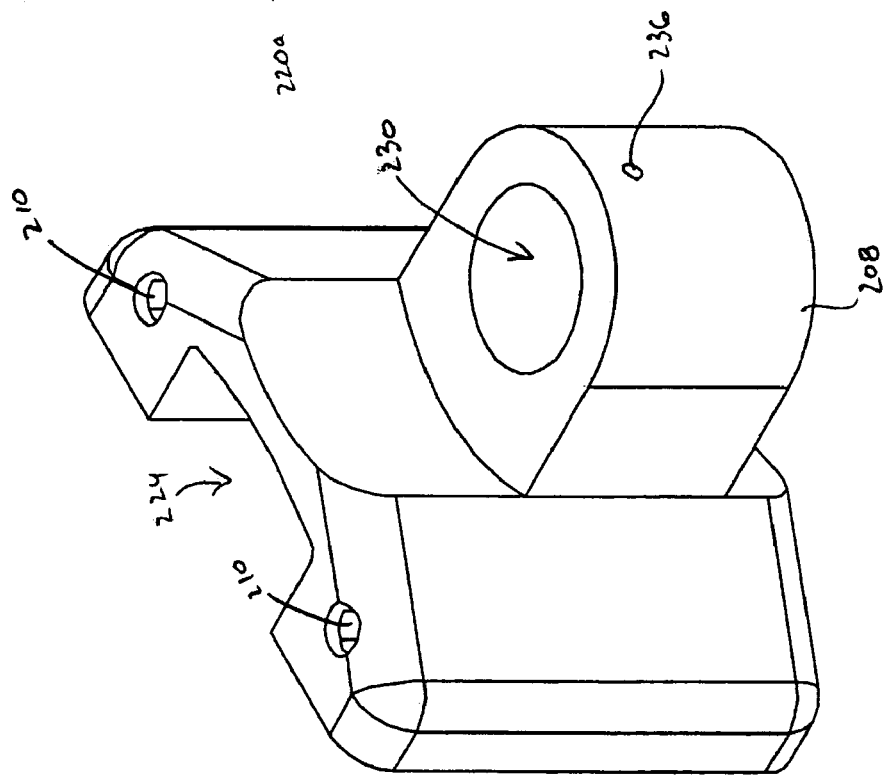

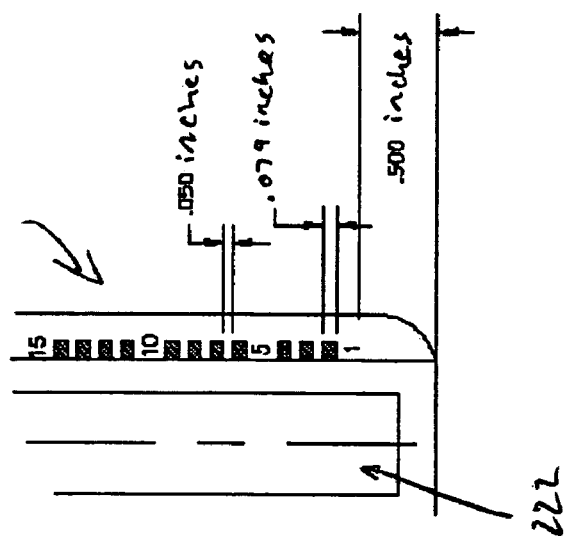

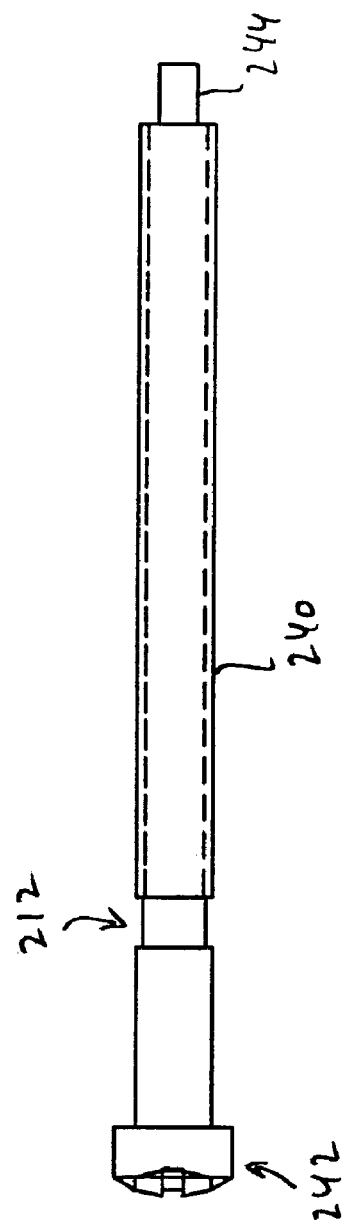
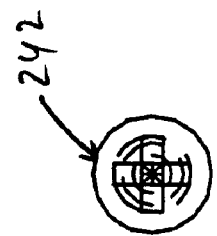
FIG. 6

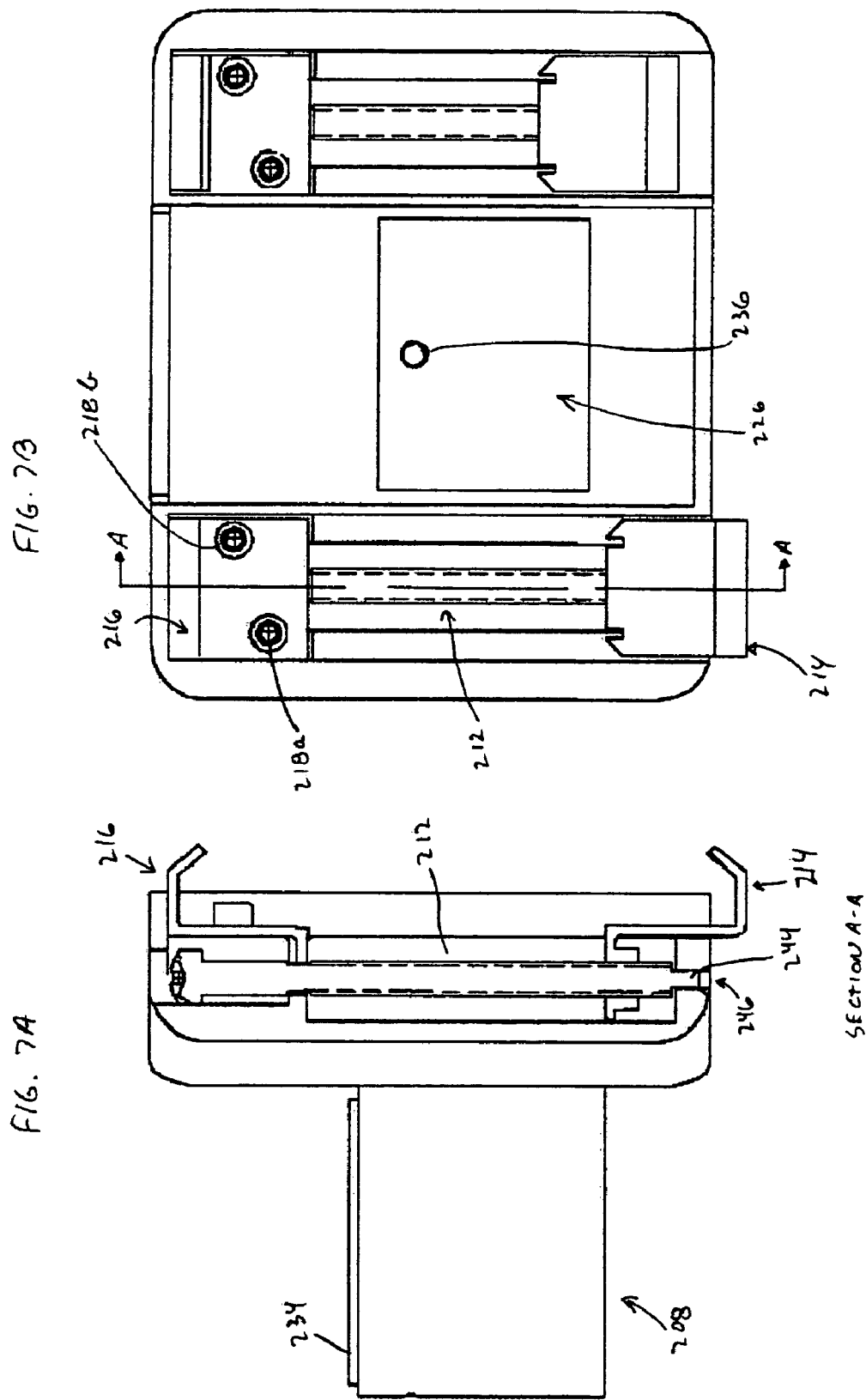

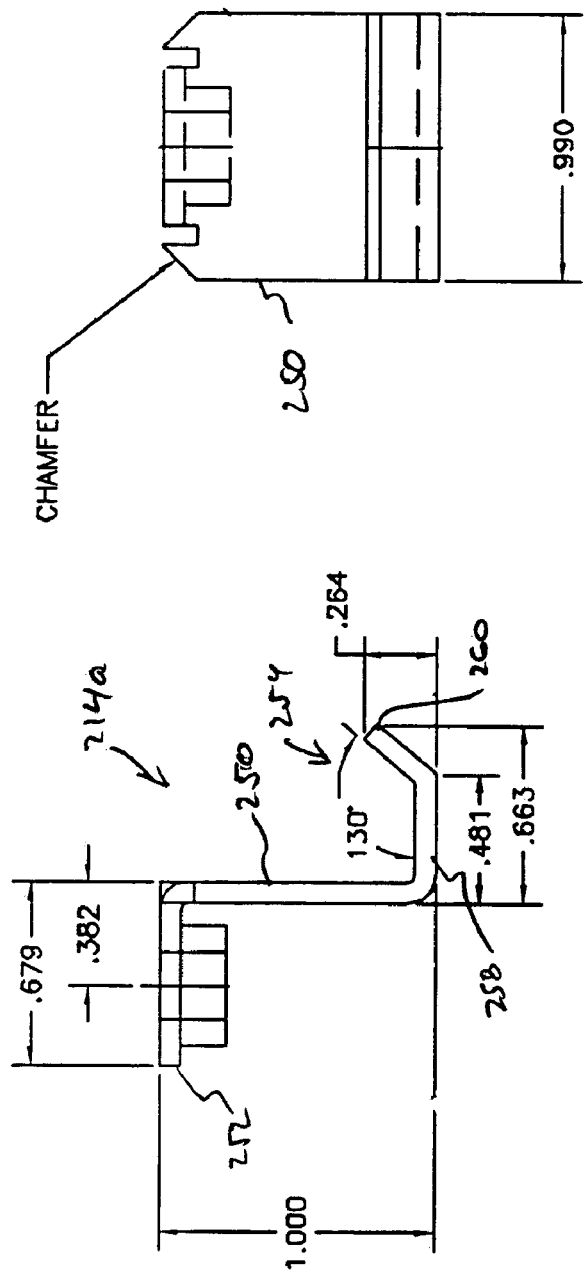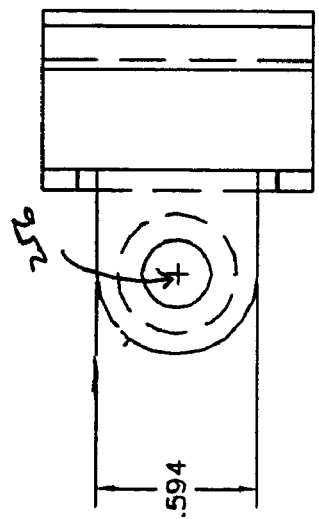
FIG. 8A

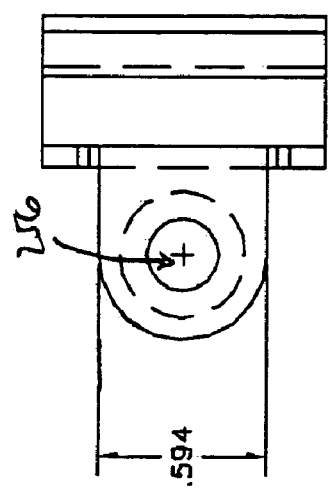
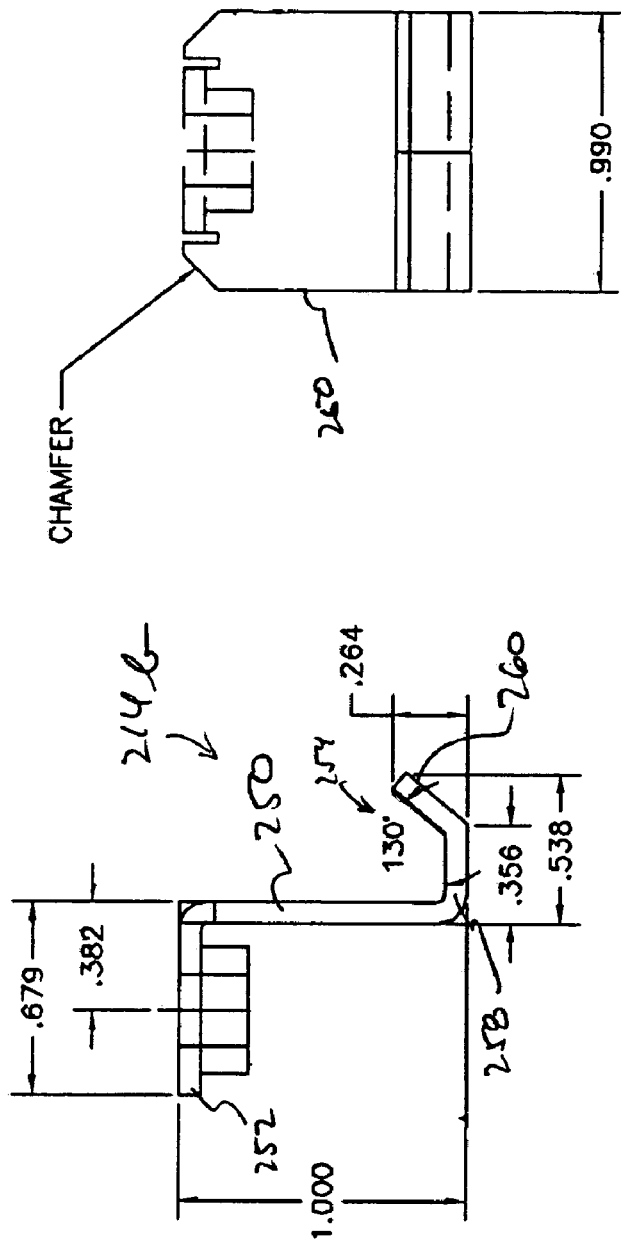
FIG. 8B

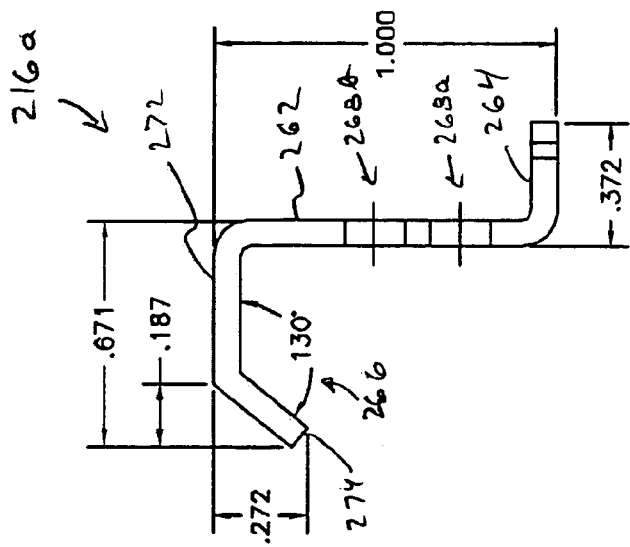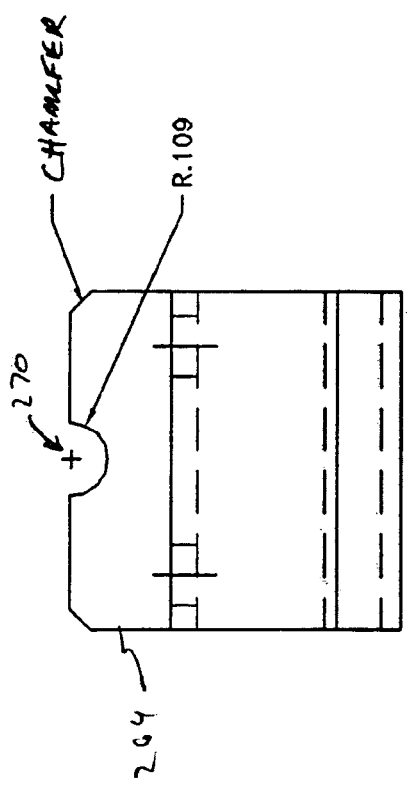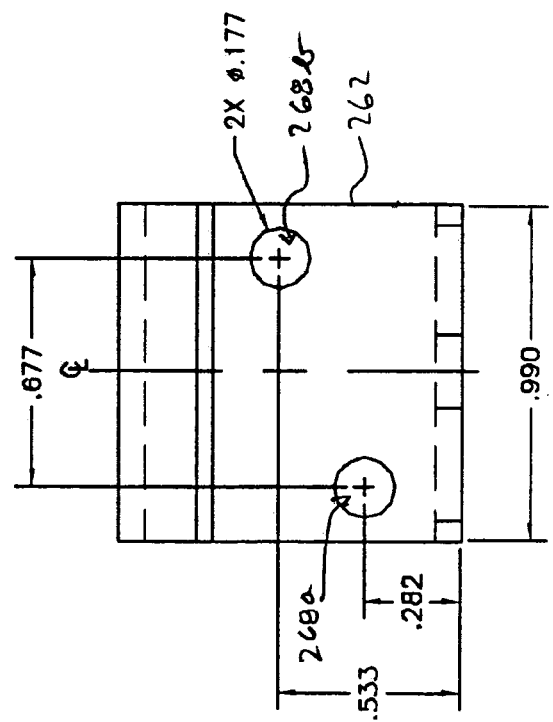
FIG. 94

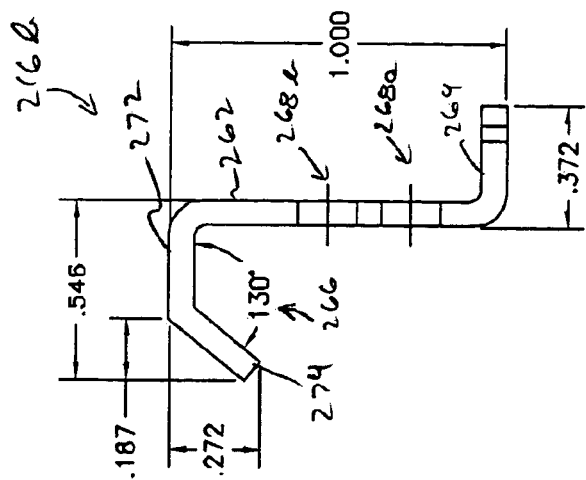
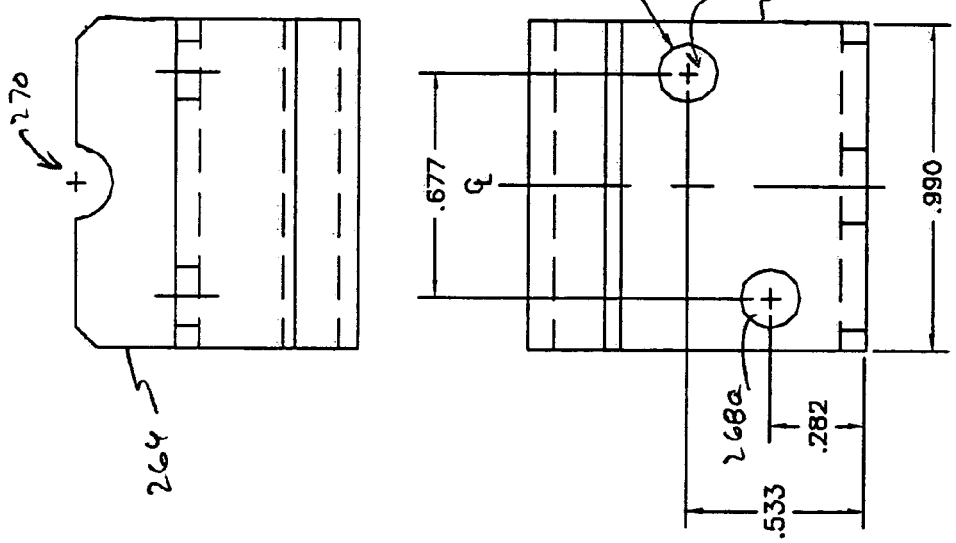
FIG. 9B

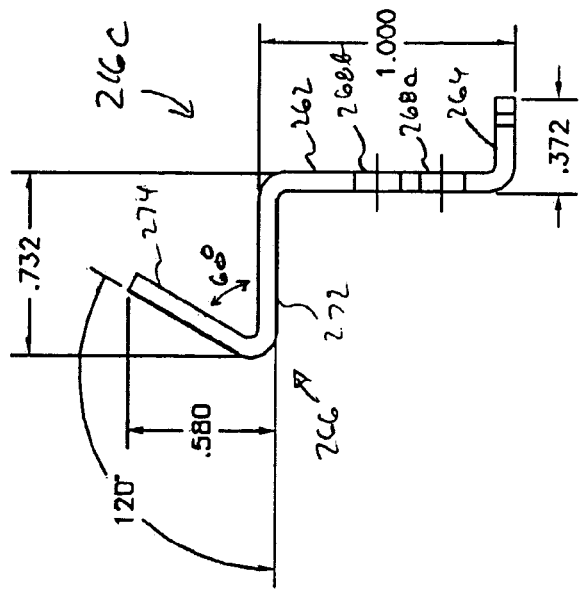
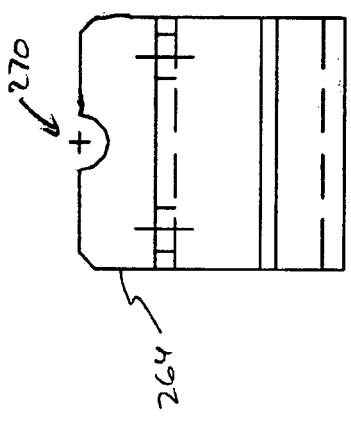
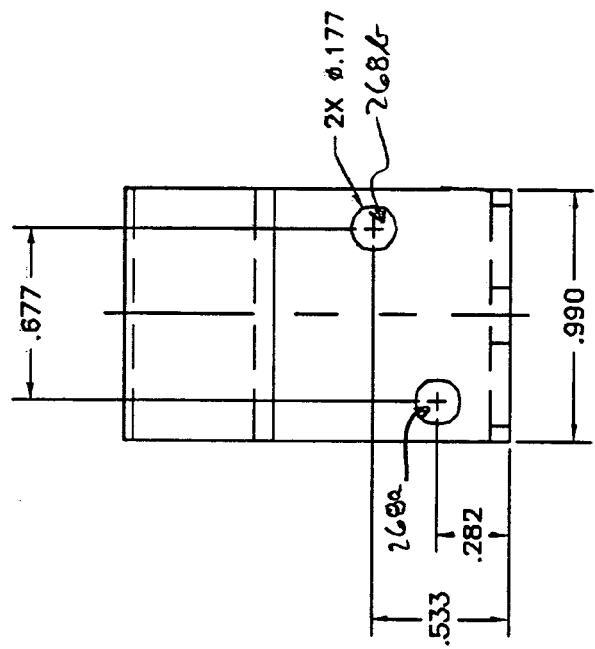
FIG. 9C

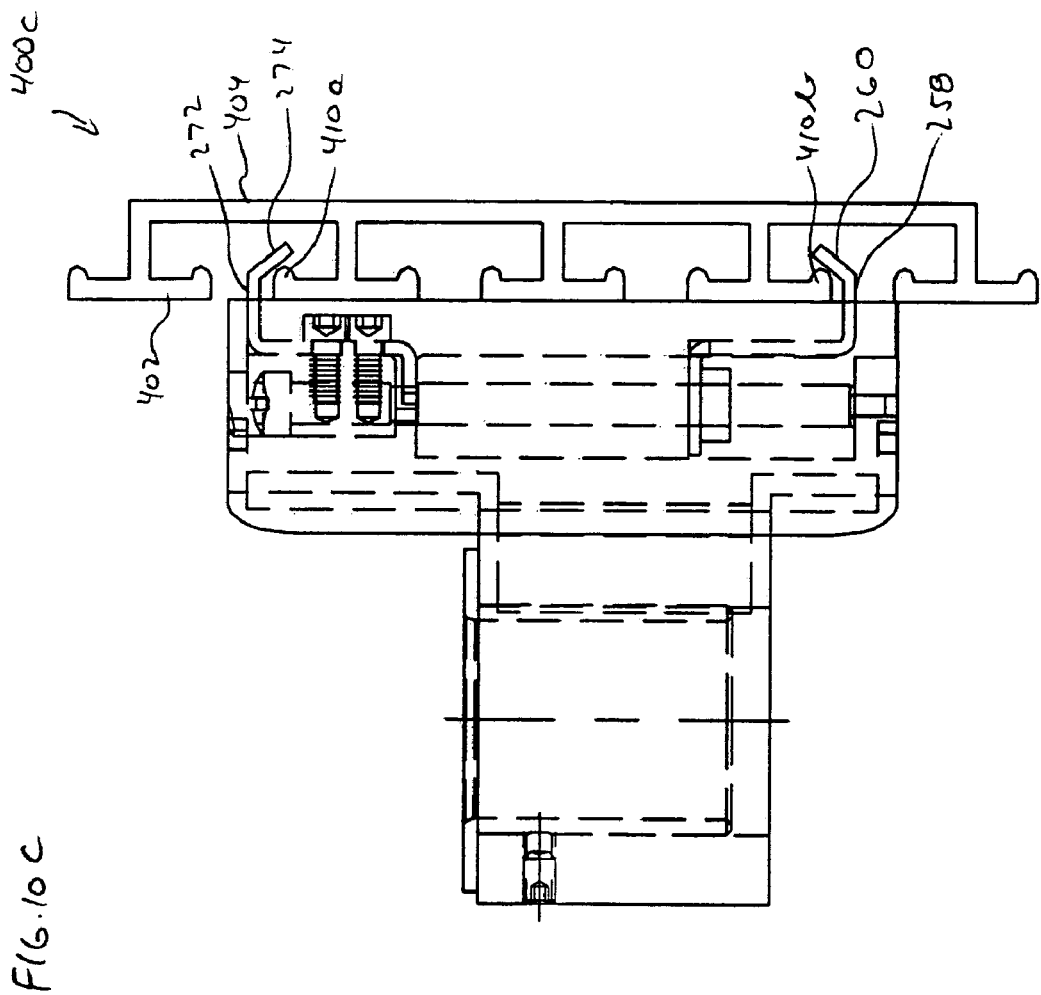

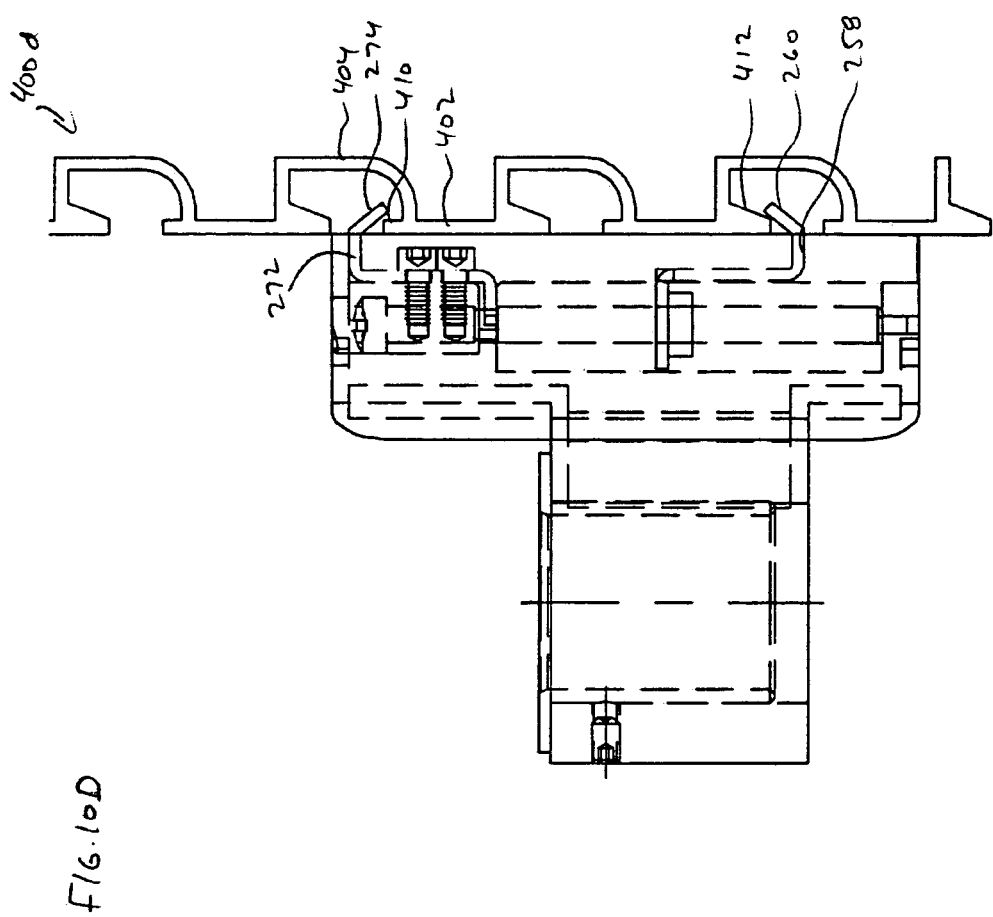

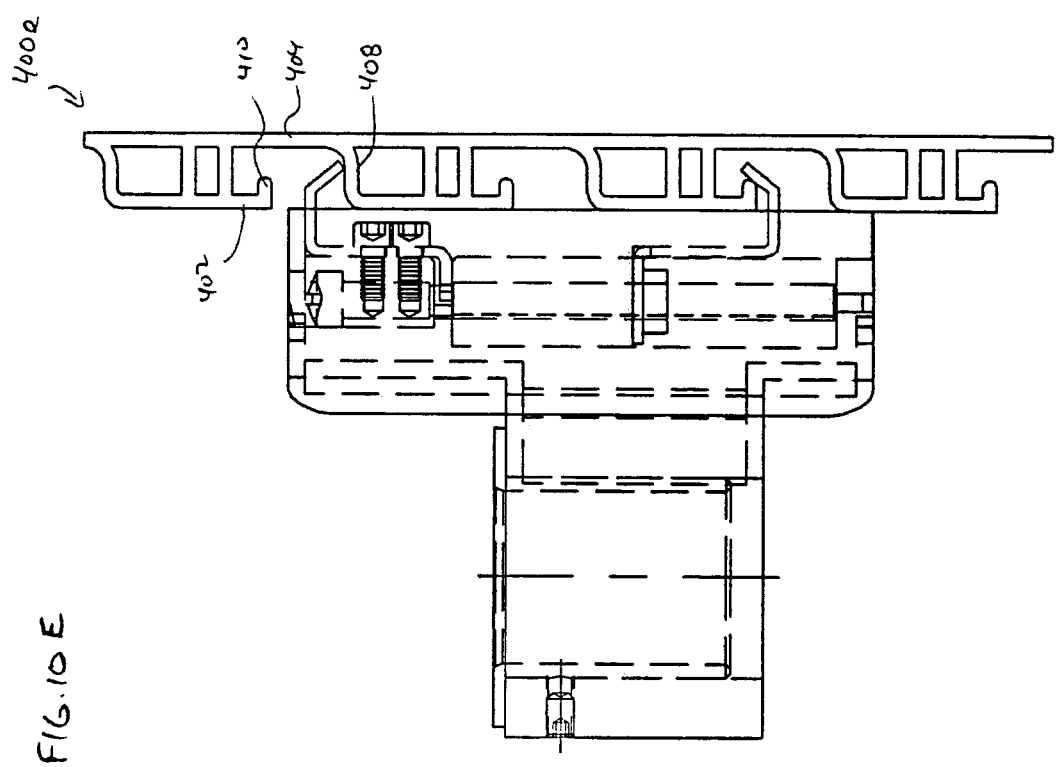

UNIVERSAL WALL MOUNTING BRACKET

BACKGROUND OF THE INVENTION

The present invention relates to a bracket for positioning devices. More particularly, the present invention relates to a universal wall-mounting assembly attachable to different slat wall configurations.

In the past people have placed video monitors and other electronic equipment on desks, tabletops, or upon other equipment such as personal computers or workstations. One drawback to these configurations is the reduction in available workspace taken up by the equipment. Another drawback is the inability to place the equipment in a desired location. A further drawback is the potential for eye strain, neck strain and/or a cumulative trauma disorder such as carpel tunnel syndrome from non-ergonomic placement of devices such as monitors and keyboards.

Different products have been provided in order to overcome these obstacles. For example, in one solution, a monitor stand or printer stand elevates the apparatus over other equipment on a desk. While this may free up workspace, it often places the equipment in an undesirable location. Another solution employs a mechanical extension arm to support the monitor. Extension arms free up workspace and allow users to place the equipment where it is wanted. One such extension arm is shown and described in U.S. Pat. No. 6,478,274, entitled "Arm Apparatus for Mounting Electronic Devices," which is fully incorporated by reference herein. Another type of extension arm is shown and described in U.S. Pat. No. 6,409,134, entitled "Arm Apparatus For Mounting Electronic Devices With Cable Management System," which is fully incorporated by reference herein.

Extension arms may attach to a workspace and provide for substantial freedom of movement of the monitor or other equipment about the workspace. However, in many cases it is not desirable to tie the extension arm to the workspace itself. In these situations, the extension arm may be mounted to a wall near the workspace using a wall mount assembly. In the past, such assemblies have used a mounting piece that connects to the extension arm and attaches to the wall. Other assemblies do not mount directly to the wall, but are affixed to a slotted wall ("slat wall") product.

Slat wall products have been used extensively in the past to hang merchandise as part of a product display. Conventionally, a hanger is inserted into a groove between a pair of slats, and the merchandise is hung from the hanger. Office equipment, such as flat panel displays and keyboards, may also be mounted to a slat wall using an extension arm and wall mount assembly. The assembly may attach to multiple grooves between pairs of slats in order to provide sufficient support for the equipment.

A drawback to mounting equipment to a slat wall in this manner is that there are numerous slat wall configurations produced by different manufacturers. For instance, the groove spacing may be different, or the slats may have projections pointing in one or both of an upward or a downward direction. In the past, in order to properly mount office equipment to a given slat wall, the coupling device had to be specifically designed to attach to that slat wall. Thus, there is a need for a wall mount assembly usable with multiple types of slat wall products.

Another drawback in mounting equipment to a slat wall is placement of cables associated with the equipment. For example, a monitor may have power and video cables connecting to an electrical outlet and a computer workstation. The cables may hang loose, providing a cumbersome and inelegant solution. Thus, there is a need for a wall mount assembly capable of providing cable management.

SUMMARY OF THE INVENTION

In an embodiment of the present invention, a wall mount assembly is provided. The wall mount assembly is used to support a mounting device and is adapted to engage a slat wall. The assembly comprises a main body, a mount, and a pair of clip assemblies. The mount attaches to the main body and is adapted to receive the mounting device. The pair of clip assemblies are attached to the main body remote from the mount and are capable of engaging the slat wall. The clip assemblies are spaced apart from each other.

Preferably, the first and second clip assemblies include an upper clip and a lower clip. The upper clips are engageable with an upper section of the slat wall. The lower clips are engageable with a lower section of the slat wall. More preferably, the upper clips are fixedly secured to the main body and the lower clips are adjustably mounted to the main body.

In an example, the clip assemblies further include adjustment means for adjustably engaging the lower clips to and from the lower section of the slat wall. In this example, the lower clips may be independently adjustable. The adjustment means may each include a threaded bolt. In this case, the main body preferably includes a pair of chambers and the threaded bolts are received within the pair of chambers. The main body may also further include a pair of access points for accessing the threaded bolts.

In a preferred example, the first and second clip assemblies each include at least one "J" shaped clip. In another preferred example, the first and second clip assemblies each include at least one clip that is generally zigzag-shaped. In a further example, the wall mount assembly may also include a bushing received within an opening of the mount. The bushing is disposed between the mount and the mounting device. In this case, the mount may include a locking mechanism for arresting rotation of the mounting device within the opening. Preferably, the locking mechanism is a set screw adapted to threadedly engage a hole in the mount and to engage the bushing.

In another embodiment of the present invention, a wall mount assembly for supporting a mounting device is provided. The assembly is adapted to engage a slat wall, and includes a main body, a mount adapted to receive the mounting device, and a pair of clip assemblies. The main body has a central portion and first and second arms attached to the central portion. The pair of arms are operable to engage the slat wall. The central portion and the pair of arms define a channel therebetween. The first clip assembly is adjustably mounted to the first arm and the second clip assembly is adjustably mounted to the second arm. The clip assemblies are engagable with the slat wall. The channel is dimensioned so that at least one cable of an electrical component supported by the mounting device is insertable through the channel between the main body and the slat wall.

Preferably, the clip assemblies each include an upper clip and a lower clip. The upper clips are engageable with an upper section of the slat wall and the lower clips are engagable with a lower section of the slat wall. More preferably, the upper clips are affixed to the first and second arms and the lower clips are adjustably mounted to the first and second arms. Alternatively, the clip assemblies may further include adjustment means for adjustably engaging the lower clips with the lower section of the slat wall. The lower clips are preferably independently adjustable. The adjustment means each may include a threaded bolt. The main body may include a pair of chambers, and the threaded bolts may be received within the chambers. In this case, the main body desirably includes a pair of access points for accessing the threaded bolts. In another example, the clip assemblies may each include at least one "J" shaped clip. In a further example, the clip assemblies may each include at least one clip that is generally zigzag-shaped.

In yet another embodiment, a wall mounting assembly for supporting a mounting device is provided. The assembly is adapted to engage a slat wall, and includes a main body, a mount attached to the main body, and first and second fastening means. The first and second fastening means are attached to the main body and are for securing the wall mounting assembly to the slat wall. The second fastening means is spaced apart from the first fastening means. Preferably, each fastening means includes an adjustment means for adjustably coupling to the slat wall.

In a further embodiment, a wall mounting assembly is provided for supporting a mounting device and adapted to engage a slat wall. The assembly comprises a main body, a mount, and first and second fastening means. The main body has a central portion and first and second arms attached to the central portion. The arms are operable to engage the slat wall. The central portion and the arms define a channel therebetween. The mount is attached to the central portion and is adapted to receive the mounting device. The first and second fastening means are associated with the first and second arms, respectively, to secure the arms to the slat wall. The channel is dimensioned so that at least one cable of an electrical component supported by the mounting device is insertable through the channel between the main body and the slat wall. Preferably, each fastening means includes an adjustment means for adjustably coupling to the slat wall.

In another embodiment, a kit of wall mounting assembly components is provided for securing a mounting device to a slat wall. The kit comprises a main body, a mount attached to the main body and adapted to receive the mounting device, and interchangeable sets of first and second fastening means. The sets of fastening means are capable of being attached to the main body and are capable of engaging the slat wall. The sets of first and second fastening means for attaching to the main body can be selected depending upon the structure of the slat wall.

In accordance with a further embodiment of the present invention, a kit of wall mounting assembly components is provided for securing a mounting device to a slat wall. The kit comprises a main body, a mount and first and second clip assemblies. The mount is attached to the main body and is adapted to receive the mounting device. The clip assemblies are capable of being attached to the main body and are capable of engaging the slat wall. Preferably, there are a plurality of interchangeable first and second clip assemblies having fastening means for attaching to the slat wall, wherein the first and second clip assemblies for attaching the main body can be selected depending upon the structure of the slat wall.

The clip assemblies may each include an upper clip and a lower clip. The upper clips are engageable with an upper section of the slat wall. The lower clips are engageable with a lower section of the slat wall. In an example, the upper clips are adapted to be fixedly secured to the main body, and the lower clips are adapted to be adjustably mounted to the main body. Alternatively, the first and second clip assemblies may each include an adjustment means for adjustably engaging the lower clips to and from the lower section of the slat wall. Preferably, the adjustment means each include a threaded bolt. In a further example, the kit further includes interchangeable sets of lower clips and interchangeable sets of upper clips. The interchangeable sets of lower clips may include at least a pair of "J" shaped lower clips and at least a pair of "J" shaped upper clips. The interchangeable sets of lower clips may alternatively include at least a pair of generally zigzag-shaped shaped lower clips and the interchangeable sets of upper clips may alternatively include at least a pair of generally zigzag-shaped upper clips.

BRIEF DESCRIPTION OF THE DRAWINGS

FIG. 1B illustrates a detailed view of the extension arm of FIG. 1A.

FIGS. 2A–B are front and rear perspective views of a fully assembled wall mount assembly according to aspects of the present invention.

FIGS. 3A–G are illustrative views of a main body portion of a wall mount assembly according to aspects of the present invention.

FIG. 6 illustrates an adjustment means in accordance with aspects of the present invention.

FIGS. 7A–B illustrate cutaway views of a wall mount assembly in accordance with aspects of the present invention.

FIGS. 8A–D illustrate lower clips in accordance with aspects of the present invention.

FIGS. 9A–C illustrate upper clips in accordance with aspects of the present invention.

FIGS. 10A–F illustrate side views of exemplary wall mount assemblies engaged with various slat wall configurations.

DETAILED DESCRIPTION

The aspects, features and advantages of the present invention will be appreciated when considered with reference to the following description of preferred embodiments and accompanying figures. In describing the preferred embodiments of the invention illustrated in the figures, specific terminology will be used for the sake of clarity. However, the invention is not intended to be limited to the specific terms so selected, and it is to be understood that each term selected includes all technical equivalents that operate in a similar manner to accomplish a similar purpose.

Figure 1A:
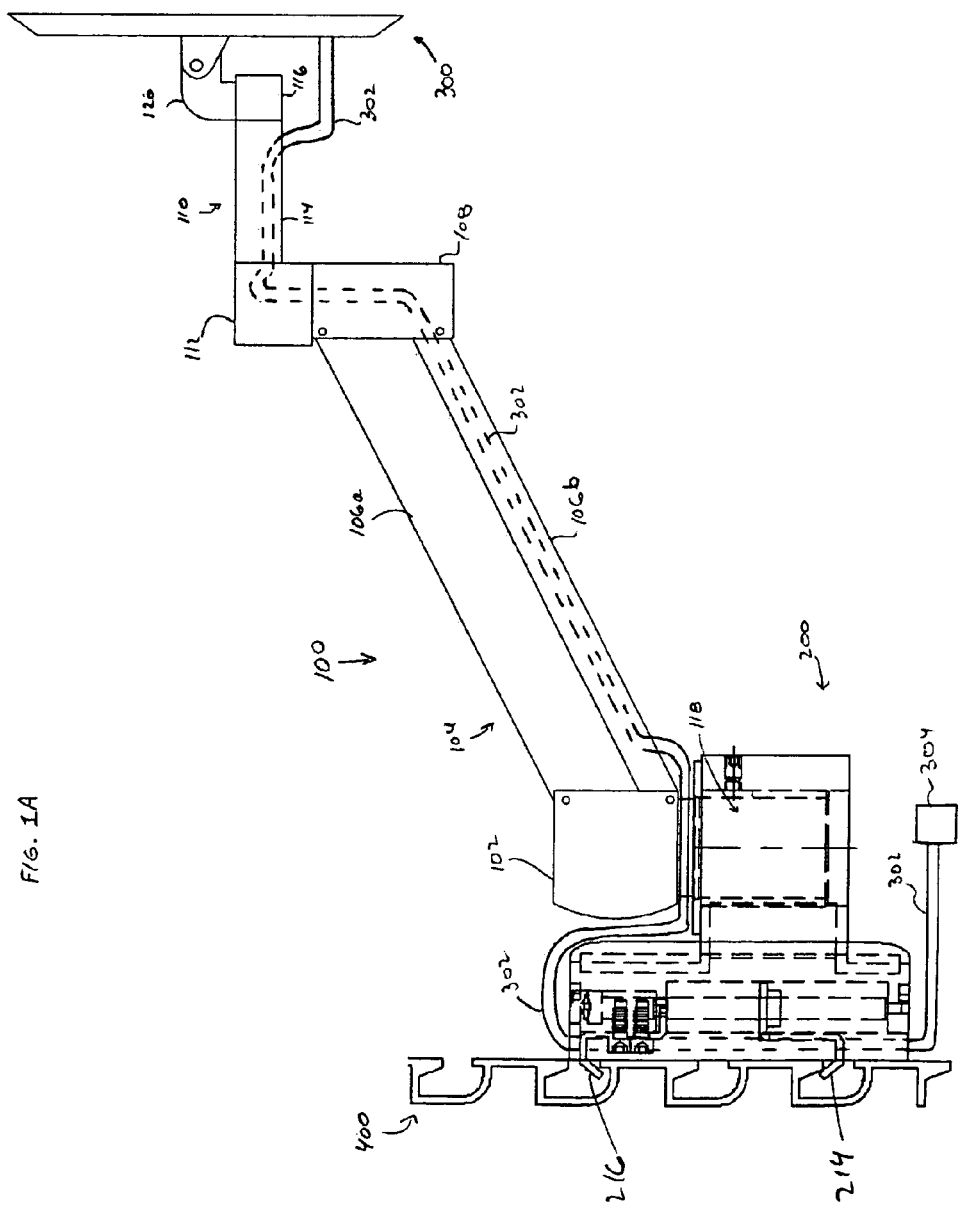
FIG. 1A is a side view of an extension arm assembly and an electronic device connected to a mounting assembly in accordance with aspects of the present invention.

FIG. 1A illustrates an extension arm 100 engaged at one end to a mounting assembly 200 and attached to an electronic device 300 such as a flat panel monitor at the other end. While the electronic device 300 is described below as a flat panel monitor or other video monitor, the invention is not limited to use with such devices, and may be used with a wide variety of equipment. A cable 302 is connected to the electronic device 300 at one end, and has a plug or other connector 304 at the other end. The mounting assembly 200 may be affixed to a slat wall 400 or similar surface. The features of the mounting assembly 200 will be explained in more detail below.

The extension arm 100 may be a conventional extension arm, and will now be described generally with reference to FIG. 1B. Preferably, the extension arm 100 is one of the types fully described in above-referenced U.S. Pat. Nos. 6,409,134 and 6,478,274. As shown in FIG. 1B, the extension arm 100 includes a first endcap 102, an arm 104, a second endcap 108 and a forearm extension 110.

The first endcap 102 includes a housing attached to one end of the arm 104 by, for example, pins. A shaft 118 is adapted for connection to the mounting assembly 200. The shaft 118 may be integrally molded with an endwall of the housing. Alternatively, the shaft 118 may be securely attached to the housing. The shaft 118 is preferably integral with the first endcap 102. As seen in FIG. 1A, the shaft 118 is insertable into the mounting assembly 200, as will be further explained below.

The arm 104 is preferably formed of an upper housing 106a and a lower housing 106b. The upper housing 106a and the lower housing 106b define a chamber therebetween containing, e.g., a gas spring (not shown). The gas spring is preferably adjustably mounted at one end within the first endcap 102 and at the other end to, e.g., a ball stud mounted within the upper housing 106a. The cable 302 may be secured within the arm 104 as shown and described in U.S. Pat. No. 6,409,134. Alternatively, the arm 104 may include one or more external cable ties in order to secure the cable 302 of the electronic device 300 supported by the extension arm 100.

The second endcap 108 has a housing attached to the second end of the arm 104 by, for example, pins. A shaft may extend out of the top of the housing of the second endcap 108 and connect to the forearm extension 110. The forearm extension 110 includes a body 114 having an interior channel, as well as a first end 112 and a second end 116. The forearm extension 110 is rotatable about an axis of the first end 112. A device 120 can be connected to the second end 116 of the forearm extension 110, and is preferably rotatable. Different devices 120 can be used to tilt, angle, pivot and/or rotate the electronic device 300. The forearm extension 110 preferably has a locking mechanism for restricting movement of the device 120. The locking mechanism may be a set screw that is insertable into a wall of the second end 116.

The upper housing 106a, the lower housing 106b, the first endcap 102 and the second endcap 108 are configured so as to form an adjustable parallelogram. When configured, the housing of the first endcap 102 and the housing of the second endcap 108 point in opposite directions. The shape of the parallelogram is retained by the gas spring within the chamber of the arm 104. Generally, the gas spring is sized so as to have a fixed length until an upward or downward force is exerted at the second endcap 108 that exceeds the gas spring's designed resistance. Thus, the gas spring retains the parallelogram shape when the only force exerted at the second endcap 108 is the weight of the electronic device 300. However, the gas spring permits the parallelogram shape to be adjusted when a user pushes the flat screen device, which is preferably coupled to the forearm extension 110 by means of the device 120, up or down.

FIGS. 2A–B illustrate the mounting assembly 200 in more detail. The mounting assembly 200 preferably has a main body section 202 with a pair of arms 204, 206, as well as a mount 208. The arms 204, 206 preferably extend to the sides and back of the main body section 202, while the mount 208 is preferably at the front of the main body section 202. The arms 204, 206 may be angled and/or contoured, and the mount 208 preferably has a rounded front face. Preferably, the mounting assembly 200 is made of aluminum, such as type 380 aluminum.

Figure 3D:
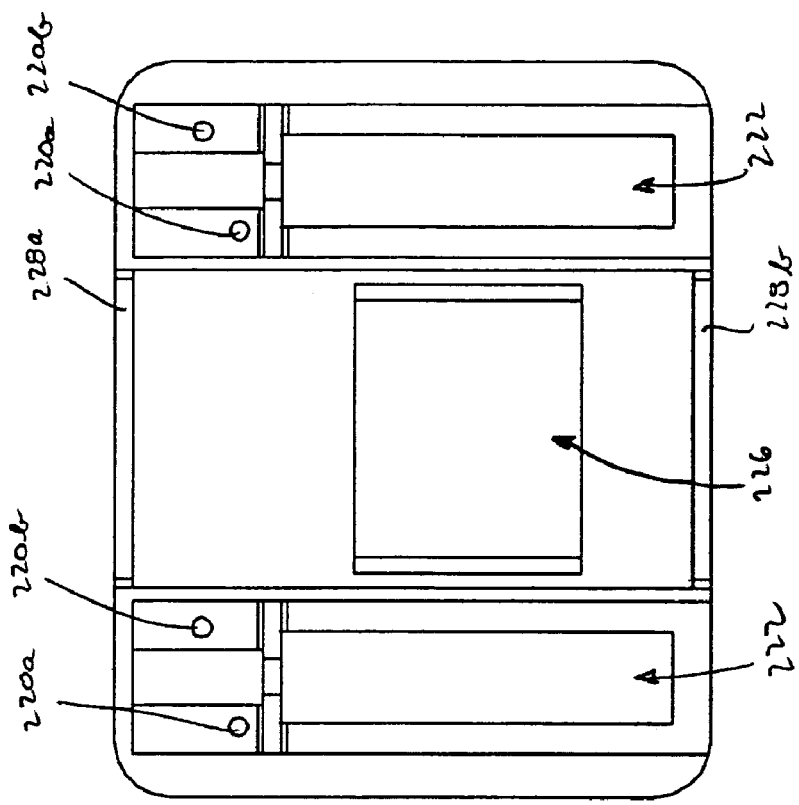
Figure 3C:
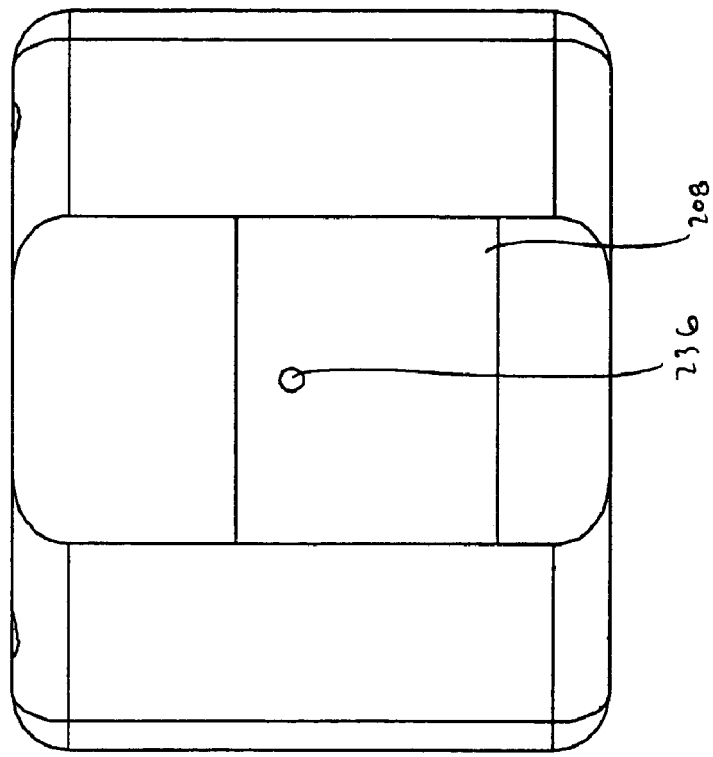
Figure 3F:
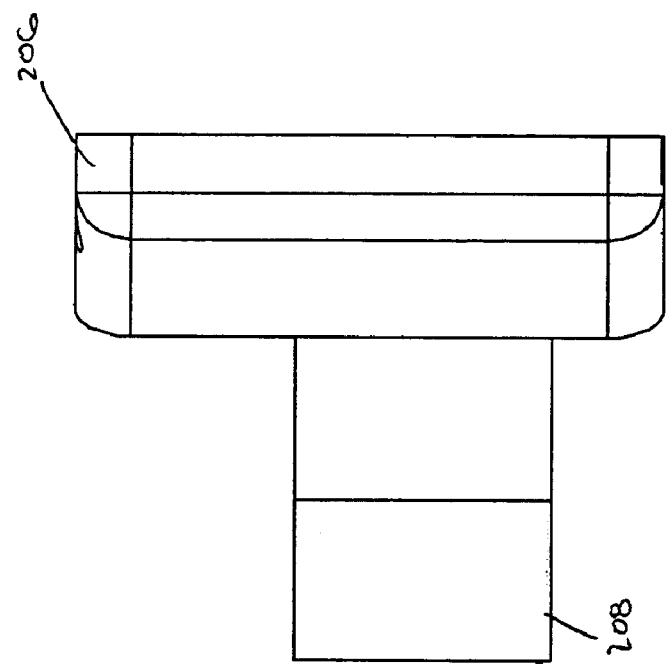

The arms 204, 206 preferably include access points 210. The access points 210 provide access to adjustment means 212 (See FIG. 2B), which engage lower clips 214, as will be explained in more detail below. The adjustment means 212 are received within chambers 222 of the arms 204, 206. (See FIGS. 2B and 3B.) A pair of upper clips 216 are preferably affixed to the arms 204, 206 by, for example, fasteners 218a, 218b. The lower clips 214 and upper clips 216 are merely illustrative of preferred fastening means, and the present invention is not limited to these specific structure types. By way of example only, the fastening means may include brackets, hooks, clamps or hasps. The fasteners 218a, 218b are preferably threaded screws which engage holes 220a, 220b, respectively, that are located in an interior surface of the arms 204, 206. (See FIGS. 3B and 3D.) Preferably, the holes 220a, 220b are offset. Optionally, additional holes and corresponding fasteners may be employed to provide additional strength and support.

Figure 3E:
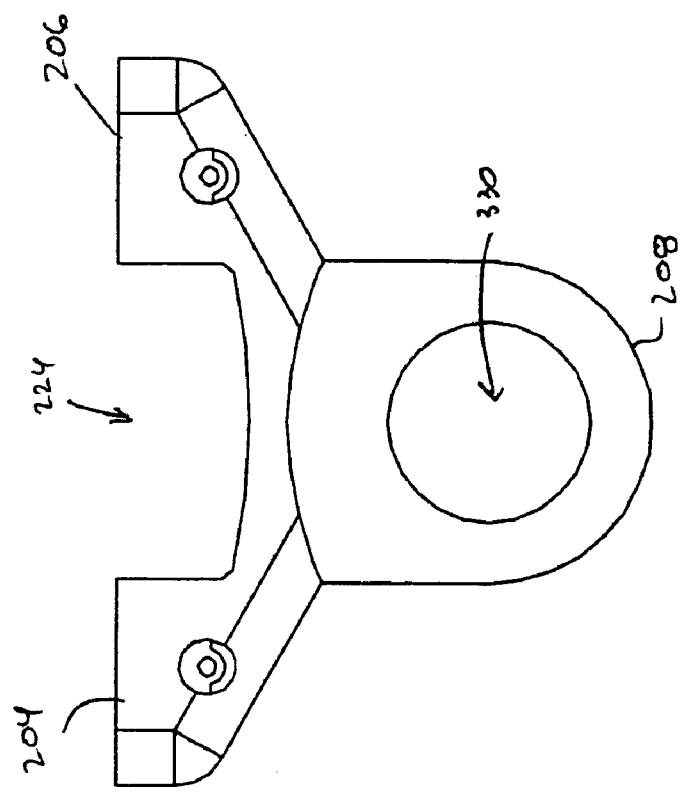

The arms 204, 206 are spaced apart to form a recess or channel 224. (See FIGS. 3A, 3B and 3E.) The recess 224 provides cable management because the cable 302 and plug 304 connected to the electronic device 300 may be passed through the recess 220 between the main body section 202 and the slat wall 400. (See FIG. 1A.) Preferably, the recess 224 has a width on the order of 1.5 to 2.0 inches and a depth between about 0.7 and 1.0 inches. The dimensions are merely desirable approximations. The dimensions may be larger or smaller depending upon, e.g., the overall size of the mounting assembly 200, the number of cables 302 passed through the recess 224, and aesthetic considerations. A sub-recess 226 may also be provided at the back of the main body section 202. The sub-recess 226 aids in the manufacturing process to achieve a uniform material thickness. The main body section 202 preferably includes upper and lower supports or ribs 228a, 228b, respectively. The ribs 228a, 228b may span across the width of the recess 224 and connect to the arms 204, 206 in order to provide additional structural support.

Figure 4:
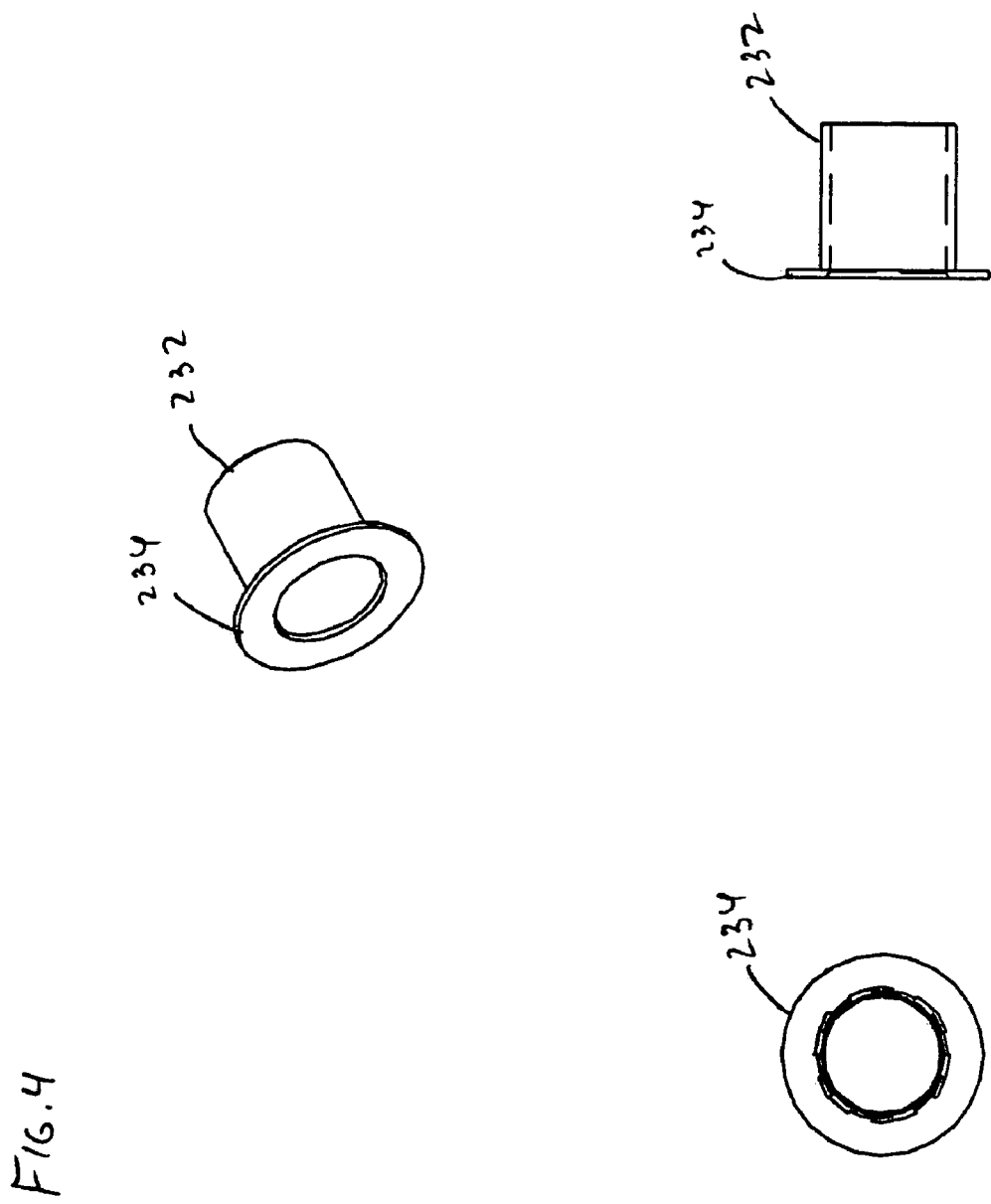
FIG. 4 illustrates a bushing in accordance with aspects of the present invention.

Referring to FIGS. 3A–F, the mount 208 preferably includes a central opening 230. The central opening is adapted to receive a bushing 232 (See FIGS. 2A and 4.) The shaft 118 of the first endcap 102 is insertable into the bushing 232. The bushing 232 provides a bearing surface upon which the shaft 118 may rotate. Preferably, the bushing 232 is made of plastic, providing a smooth surface that minimizes friction and avoids metal-to-metal contact between the shaft 118 and the mount 208. Moreover, a lip 234 of the bushing 232 preferably protrudes from the central opening 230 and acts as a washer between the endcap 102 and the mount 208. This again minimizes friction and avoids metal-to-metal contact. The bushing 232 may be press fit into the central opening 230. In one example, the bushing 232 is open at the bottom to allow different size shafts 118 of the endcap 102 to pass through. Alternatively, the bushing 232 may not be employed. In this case, the central opening 230 is preferably coated or covered by a friction-reducing component or material. It is to be appreciated that alternative embodiments of the mount 208 do not require the central opening 230. For example, the mount 208 may include a post or shaft that engages an opening on the endcap 102. In another alternative, the endcap 102 may be bolted or screwed to a plate on the mount 208. The above are merely illustrative of different ways of connecting the extension arm 100 (or electronic device 300) to the mounting assembly 200.

Figure 5A:
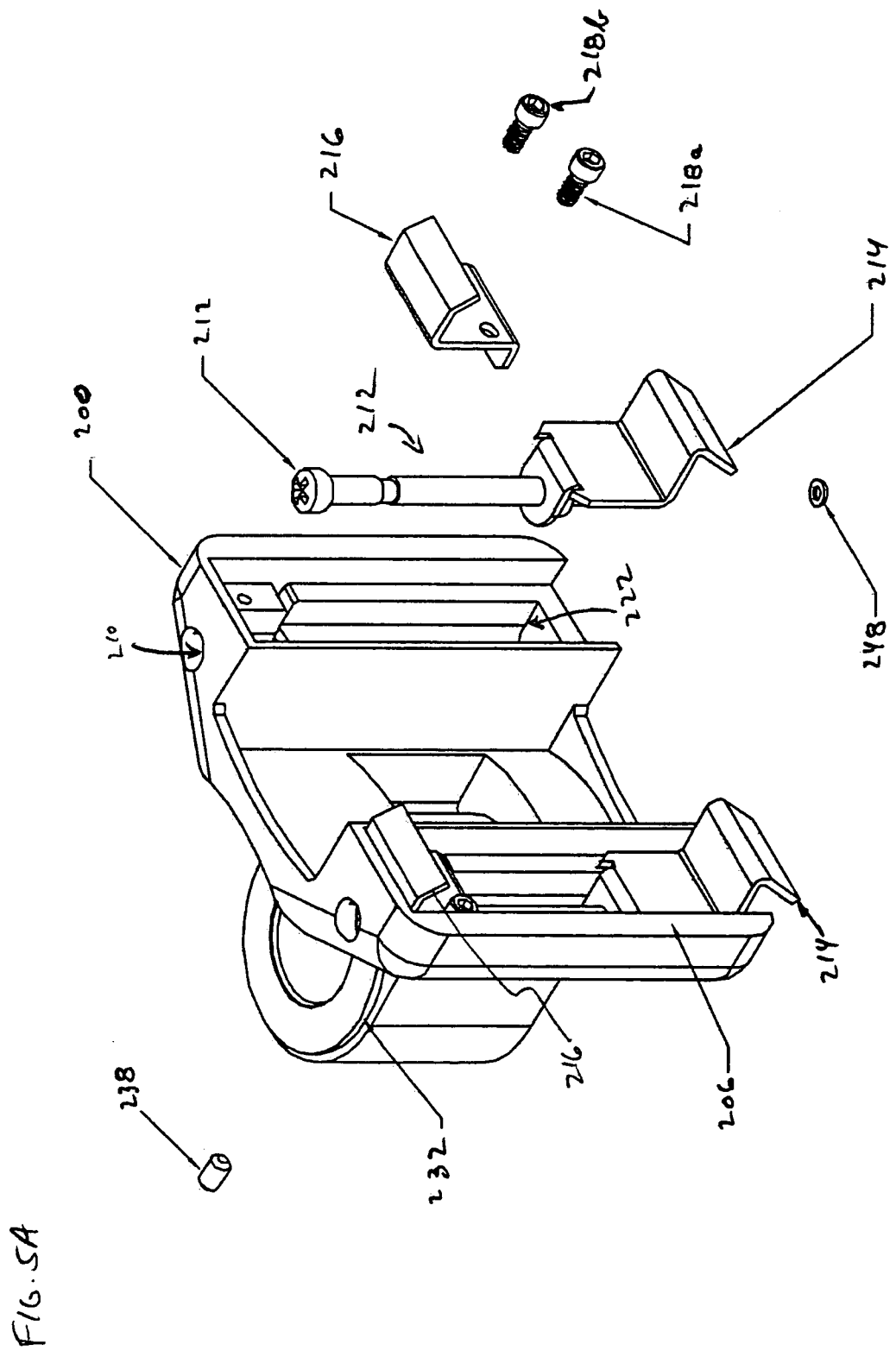
FIGS. 5A–E are exploded perspective views of wall mount assembly components in accordance with aspects of the present invention.
Figure 5E:
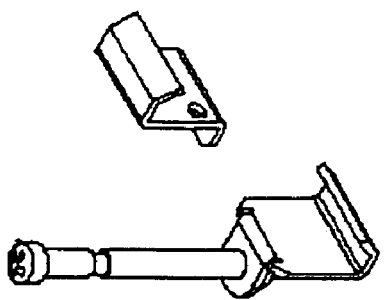
Figure 5D:
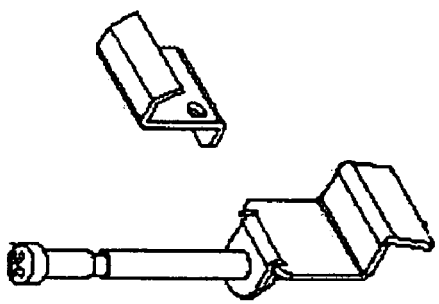
Figure 5C:
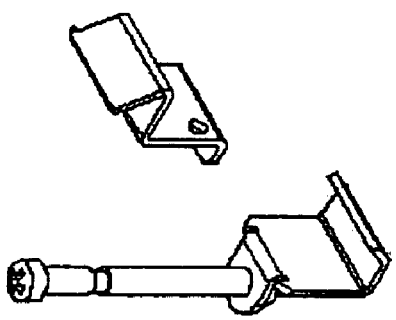
Figure 5B:
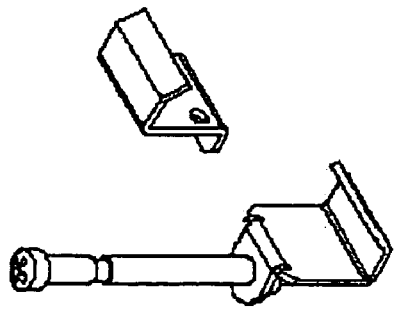

The mount 208 preferably includes a locking mechanism for restricting movement of the shaft 118 within the central opening 230. The locking mechanism may comprise a hole 236 (FIGS. 3A and 3B) and a set screw 238 (FIGS. 2A and 5A). The set screw 238 is insertable into the hole 236 in a wall of the mount 208. When the set screw 238 is tightened, it causes the bushing 232 to flex inward and frictionally engage the shaft 118. Alternatively, the locking mechanism may be any other mechanism, e.g., a latch, clamp, clasp or hasp, which is capable of performing the equivalent function to constrict rotation of the shaft 118 in the central opening 230.

The adjustment means 212, lower clips 214 and upper clips 216 are illustrated by the exploded view of FIG. 5A. In a preferred example, the adjustment means 212 is a bolt that is maintained within the chamber 222. The adjustment means 212 may comprise other kinds of devices that perform the general function of moving the lower clip 214 (and/or the upper clip 216) to engage the slat wall 400.

FIG. 6 illustrates the bolt as having a body 240 connected to a head 242 at one end and to a tail 244 at the other end. The body is preferably threaded. The head 242 preferably includes slots or a hex socket so that, e.g., a screwdriver or Allen wrench may turn the bolt. More preferably, the head 242 is slotted to receive a Philips head screwdriver. The tail 244 is receivable by a recess or through hole 246, as best seen by FIGS. 7A and 7B. Preferably, a washer 248 is disposed between the bottom of the body 240 and the arm 204 or 206.

As seen in the perspective view of FIG. 5A and the views of FIGS. 7A–B, the lower clip 214 engages the adjustment means 212. FIG. 7A illustrates a cutaway view along the A—A cross section. The components can be assembled as follows. The lower clip 214 can be threaded onto the body 240 of the bolt. The washer 248 can be inserted onto the tail 244, and then the tail 244 can be inserted into the recess 246. Then, the body 240 and the head 242 can be placed into the chamber 222. Finally, the upper clip 216 is attached to the arm 204 or 206 by the fasteners 218a, 218b. In the situation where the adjustment means 212 is a threaded bolt, the lower clip 214 is raised or lowered by turning the bolt by, e.g., a screwdriver or Allen wrench. The adjustment allows the mounting assembly 200 to connect to different types of slat wall 400 having slats of different dimensions.

FIG. 3G is a cutaway view of the arm 204. As seen in the figure, a series of numbers, dashes and/or gradations (collectively "settings") are preferably provided. The settings allow the lower clip 214 to be pre-positioned at a desired height, and allows a user to conveniently adjust the lower clip 214, depending upon the configuration of the slat wall 400. For example, a slat wall of type A might require a setting of 10, while a setting of 5 may provide the most secure fit for a type B slat wall.

Each lower clip 214 is adjustable independent of the other lower clip 214. It should also be noted that while the upper clip 216 has been illustrated as fixed and the lower clip 214 has been illustrated as adjustable, other embodiments of the invention may permit the upper clip 216 to be adjustable while the lower clip 214 is fixed. In this situation, the access points 210 may be located, for example, at the bottom of the mounting assembly 200. Alternatively, both clips 214, 216 may be adjustable, either together or independently.

The lower and upper clips 214, 216 shown in FIG. 5A are merely illustrative of a pair of clips usable in various embodiments of the present invention. Other preferred clip combinations include those shown in FIGS. 5B–E. The specific details of these clips are shown with regard to FIGS. 8A–D and 9A–C. FIGS. 8A–D illustrate preferred types of lower clips 214 and FIGS. 9A–C illustrate preferred types of upper clips 216 usable with the invention.

In FIG. 8A, lower clip 214a has a generally "J" shape formed of a substantially vertical member 250 connected to a top member 252 at one end and to a bottom member 254 at the other end. The portion of the vertical member 250 near the top member 252 may be chamfered or beveled, and may include stress release points as well. The top member 252 includes an opening 256 which engages the adjustment means 212. For example, the body 240 of a bolt may threadedly engage the opening 256.

The bottom member 254 is preferably comprised of a generally flat face 258 and an angled face 260. In lower clip 214a, the angled face 260 is preferably on the order of 0.33 inches in length. As seen in FIG. 8A, the length of the flat face 258 is on the order of 0.5 inches. Preferably, the angled face 260 is at an angle on the order of about 130° with respect to the flat face 258. The angled face 260 angles upward toward the vertical member 250 while facing away from the top member 252. One or both of the faces 258 and 260 may engage or otherwise grip a slat wall, as will be described in more detail below.

Lower clip 214b of FIG. 8B is substantially similar to lower clip 214a. The angle between the flat face 258 and the angled face 260 is also preferably about 130°. The primary difference in lower clip 214b is that the length of the flat face 258 is preferably about 0.35 inches.

Figure 8C:
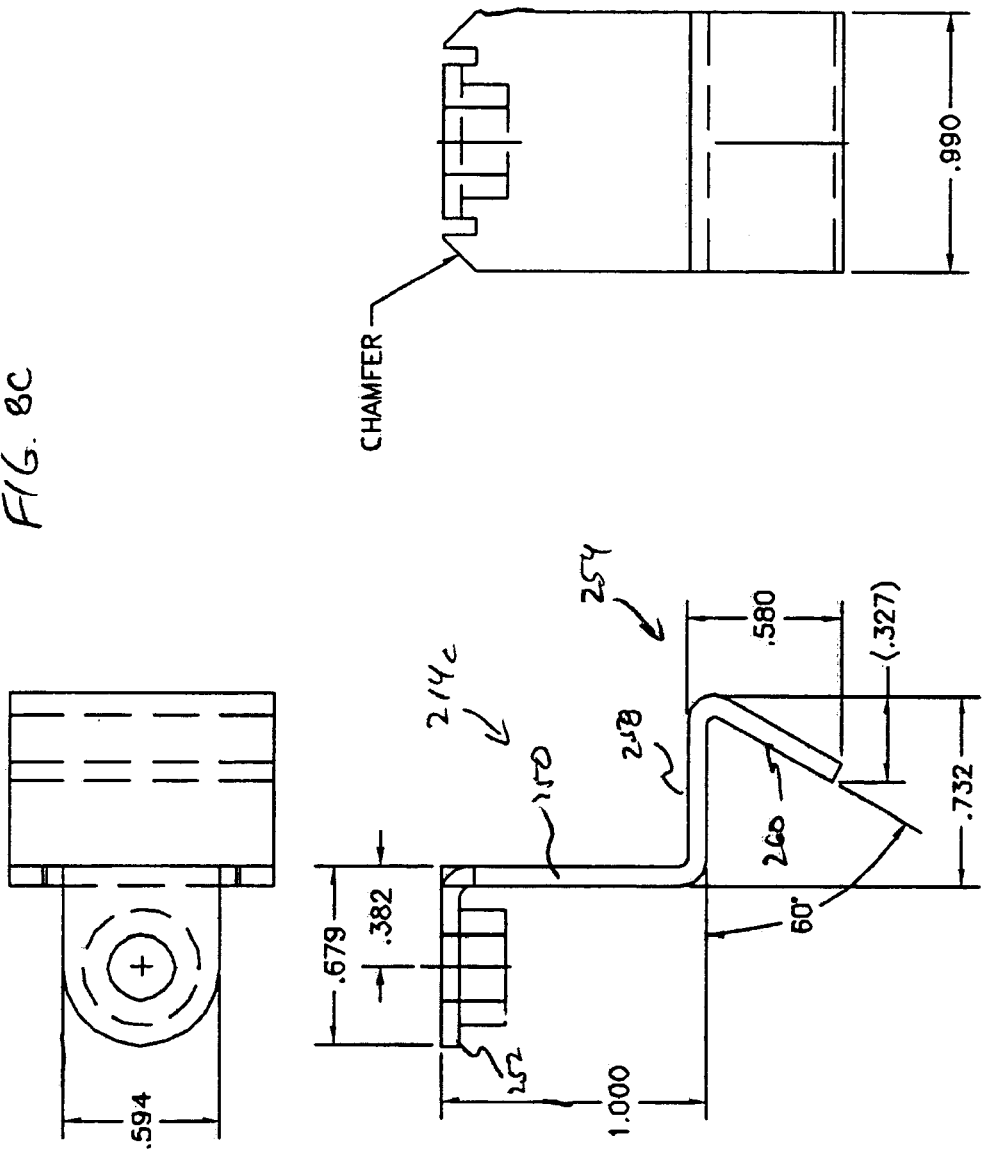

FIG. 8C illustrates a lower clip 214c having a generally zigzag shape, wherein the angled face 260 angles away from the vertical member 250 and faces toward the top member 254. The angle between the flat face 258 and the angled face 260 is preferably on the order of about 60°. The flat face 258 is preferably on the order of 0.75 inches and the angled face is preferably on the order of about one inch.

Figure 8D:
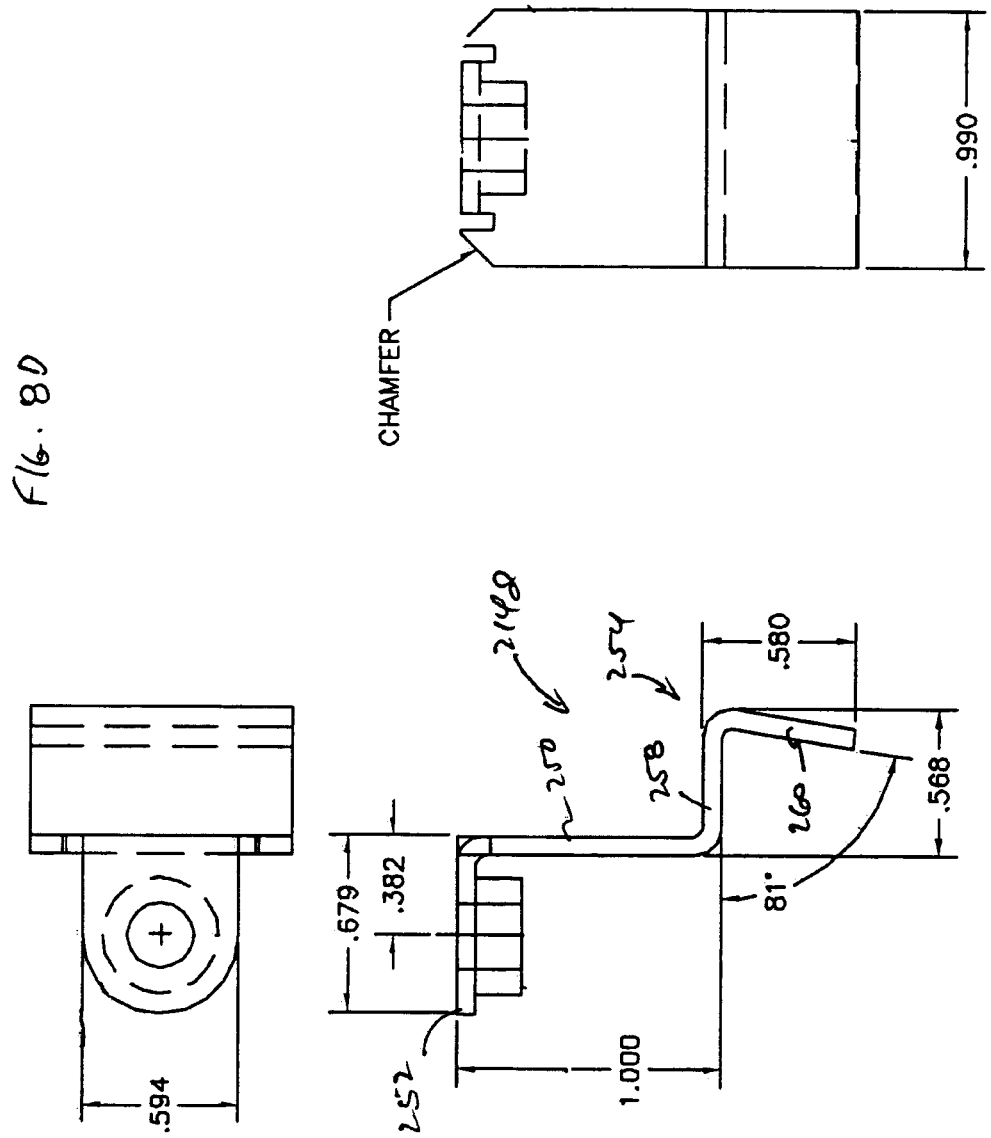

Lower clip 214d of FIG. 8D is substantially similar to lower clip 214c. The angle between the flat face 258 and the angled face 260 is on the order of 80°. The length of the flat face 258 is preferably at least 0.5 inches. The length of the angled face 260 is desirably on the order of at least 0.5 inches.

Referring now to FIG. 9A, it can be seen that the upper clip 216a has a structure somewhat similar to the lower clip 214a of FIG. 8A. The upper clip 216a has a generally inverted "J" shape formed of a substantially vertical member 262 connected to a bottom member 264 at one end and to a top member 266 at the other end. The vertical member 262 includes a pair of through holes 268a, 268b to receive the fasteners 218a, 218b. (See FIG. 2B.) The bottom member 264 may have chamfered edges, and preferably includes a recess or cutout 270 to secure the adjustment means 212 within the chamber 222. (See FIG. 7A.)

The top member 266 is preferably comprised of a generally flat face 272 and an angled face 274. In the upper clip 216a, the flat face 272 is preferably on the order of 0.5 inches in length, and the angled face 274 is preferably on the order of 0.33 inches in length. Preferably, the angled face 274 is at an angle on the order of 1300 with respect to the flat face 272. The angled face 274 is angled down toward the vertical member 250 while pointing away from the top member 252. One or both of the faces 272 and 274 may engage or otherwise grip a slat wall, as will be described in more detail below.

Upper clip 216b of FIG. 9B is substantially similar to upper clip 216a. The angle between the flat face 272 and the angled face 274 is preferably also about 130°. The primary difference in upper clip 216b is that the length of the flat face 272 is preferably about 0.35 inches.

Upper clip 216c of FIG. 9C has a generally zigzag-shaped structure similar to the lower clip 214c of FIG. 8c. FIG. 9C illustrates the upper clip 216c wherein the angled face 274 angles away from the vertical member 262 and faces toward the bottom member 264. The angle between the flat face 272 and the angled face 274 is preferably about 60°. Preferably, the flat face 272 is on the order of 0.75 inches and the angled face is on the order of about one inch.

Different lower and upper clip pairs 214, 216 may be employed depending upon the type of slat wall used. Preferably, the lower and upper clips 214 and 216 are made of metal. FIGS. 10A–10F illustrate how various combinations of clips can be used with the mounting assembly 200 to attach to different slat wall types 400a–400f.

Figure 10A:
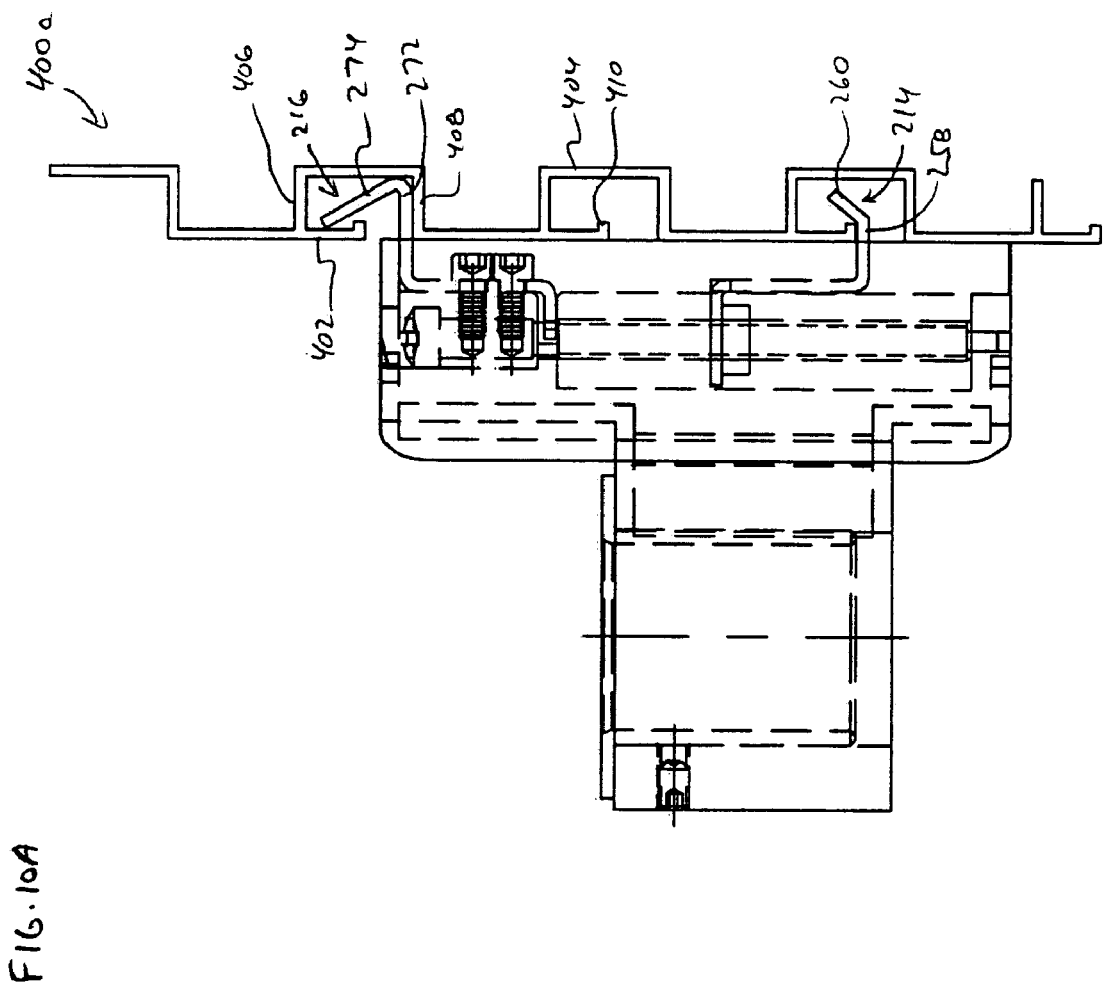

As seen in FIG. 10A, the slat wall 400a has a front facade 402, a back 404 and top and bottom parts 406 and 408, respectively. The front facade 402 includes a lip 410. The upper clip 216 and the lower clip 214 preferably engage the slat wall 400a in the following manner. The upper clip 216 may slide or be angled into the interior region bounded by the front facade 402, the back 404 and the top and bottom parts 406 and 408. The lower clip 214 is preferably angled into the interior region of another segment of the slat wall 400a. Then, the adjustment means 212 is operated to raise the lower clip 214, for example. The angled face 274 may then "grab" the interior of the front facade 402 and/or the lip 410, while the flat face 272 is in contact with the bottom part 408. The angled face 260 and the flat face 258 of the lower clip 214 may "grab" a second lip 410 of the slat wall 400a. When the adjustment means 212 tightens the clips 214, 216, the backs of the arms 204, 206 are preferably pulled into contact with the front facade 402.

Figure 10B:
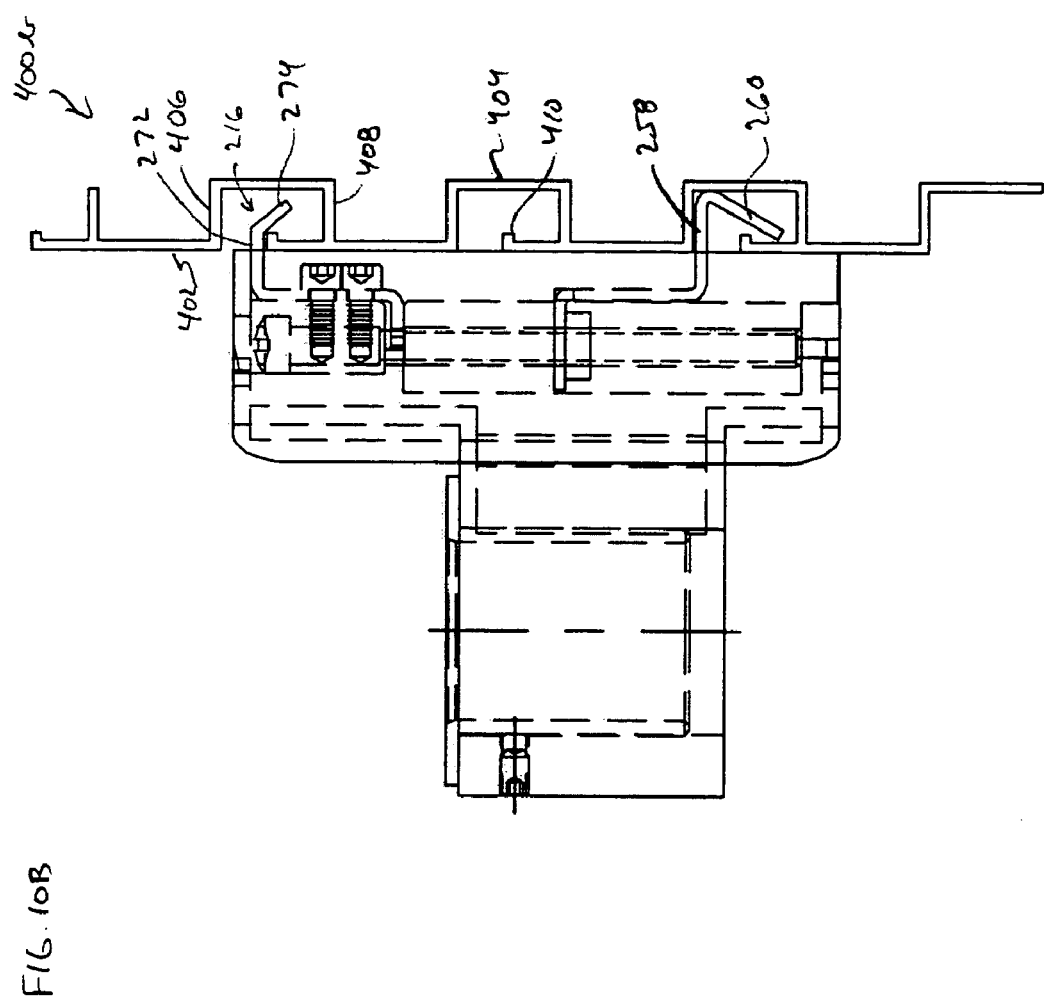

The slat wall 400b has a configuration similar to the slat wall 400a, as illustrated in FIG. 10B. Thus, the operation of the upper and lower clips 216 and 214 is generally the same. However, in this case, the lower clip 214 may slide or be angled into the interior region bounded by the front facade 402, the back 404 and the top and bottom parts 406 and 408. The upper clip 216 may then be angled into the interior region of another segment of the slat wall 400b.

In FIG. 10C, the front facade 402 of slat wall 400c has lower and upper lips 410a and 410b, respectively. Here, the angled faces 260, 274 of the lower and upper clips 214, 216 engage the lower and upper lips 410b, 410a, respectively. Optionally, the flat faces 258 and 272 also engage the lower and upper lips 410b, 410a.

In FIG. 10D, the front facade 402 of slat wall 400d has the lip 410 and a thickened wall 412. Here, the angled face 260 (and preferably flat face 258) of the lower clip 214 engages the thickened wall 412. The angled face 274 of the upper clip 216 engages the lip 410.

In FIG. 10E, the front facade 402 of slat wall 400e has the lip 410. The bottom part 408 may be rounded or angled. Here, the angled face 260 (and preferably flat face 258) of the lower clip 214 engages the lip 410. The angled face 274 of the upper clip 216 engages the bottom part 408.

Figure 10F:
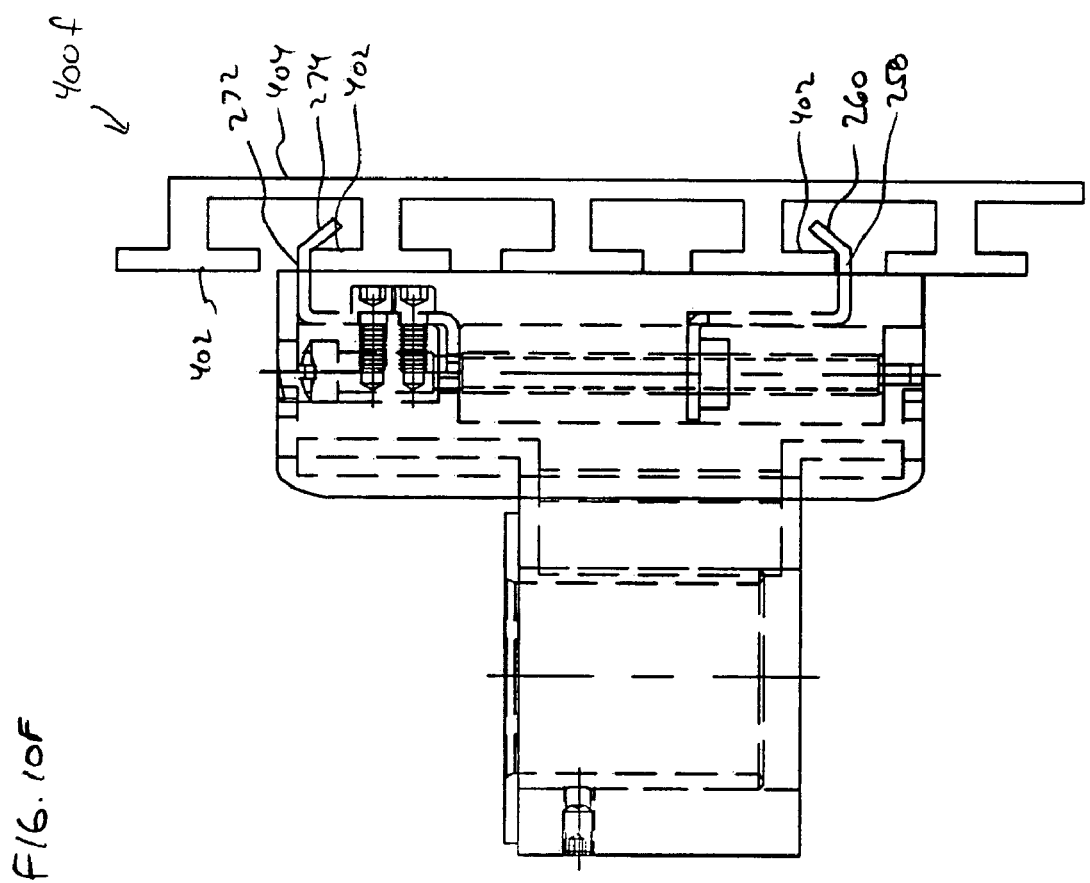

In FIG. 10F, the front facade 402 of slat wall 400f does not have lower and upper lips as seen in FIG. 10C. However, the clips 214, 216 operate in a similar manner as in that example. The angled faces 260, 274 of the lower and upper clips 214, 216 engage the front facade 402. Optionally, the flat faces 258 and 272 also engage the front facade 402.

The slat wall configurations 400a–f are merely illustrative of several commercially employed designs. As can be seen from FIGS. 10A–F, different kinds of lower and upper clips 214, 216 can be used with any slat wall type. Thus, kits of mounting assemblies 200 can be provided with assorted lower and upper clip sets so that a consumer may purchase one package and be able to mount assorted types of mounting arms 100 to different slat walls 400. It is also important to note that the dimensions for the various lower and upper clips 214, 216 presented above are merely preferred. Other sizes and angles may be used depending upon the type of slat wall 400 used.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A wall mounting assembly for supporting a mounting device and adapted to engage a slat wall having an upper section and a lower section, the wall mounting assembly comprising:
   a main body;
   a mount attached to the main body and adapted to receive the mounting device;
   a first clip assembly attached to the main body and remote from the mount, the first clip assembly including an upper clip and a lower clip, the upper clip being engageable with the upper section of the slat wall, and the lower clip being engageable with the lower section of the slat wall; and
   a second clip assembly attached to the main body and remote from the mount, the second clip assembly including an upper clip and a lower clip, the upper clip being engageable with the upper section of the slat wall, and the lower clip being engageable with the lower section of the slat wall;
   wherein the second clip assembly is spaced apart from the first clip assembly, at least one of the upper clip or the lower clip of the first clip assembly is adjustable relative to the other one of the upper clip and the lower clip thereof, and at least one of the upper clip or the lower clip of the second clip assembly is adjustable relative to the other one of the upper clip and the lower clip thereof.

2. The wall mounting assembly of claim 1, wherein:
   the upper clips of the first and second clip assemblies are fixedly secured to the main body; and
   the lower clips of the first and second clip assemblies are adjustably mounted to the main body.

3. The wall mounting assembly of claim 1, wherein the first and second clip assemblies each further include an adjustment means for adjustably engaging the lower clips to and from the lower section of the slat wall.

4. The wall mounting assembly of claim 3, wherein the lower clips are independently adjustable.

5. The wall mounting assembly of claim 3, wherein the adjustment means each include a threaded bolt.

6. The wall mounting assembly of claim 5, wherein the main body includes a pair of chambers, and the threaded bolts are received within the pair of chambers.

7. The wall mounting assembly of claim 6, wherein the main body further includes a pair of access points for accessing the threaded bolts.

8. The wall mounting assembly of claim 1, wherein the first and second clip assemblies each include at least one "J" shaped clip.

9. The wall mounting assembly of claim 1, wherein the first and second clip assemblies each include at least one clip that is generally zigzag-shaped.

10. The wall mounting assembly of claim 1, further comprising a bushing received within an opening of the mount, wherein the bushing is disposed between the mount and the mounting device.

11. The wall mounting assembly of claim 10, wherein the mount further includes a locking mechanism for arresting rotation of the mounting device within the opening.

12. The wall mounting assembly of claim 11, wherein the locking mechanism is a set screw adapted to threadedly engage a hole in the mount and to engage the bushing.

13. A wall mounting assembly for supporting a mounting device and adapted to engage a slat wall, the wall mounting assembly comprising:
   a main body having a central portion and first and second arms attached to the central portion, the first and second arms being operable to engage the slat wall, the central portion and the first and second arms defining a channel therebetween;
   a mount attached to the central portion and adapted to receive the mounting device;
   a first clip assembly adjustably mounted to the first arm and engageable with the slat wall, the first clip assembly including an upper clip and a lower clip, the upper clip being engageable with an upper section of the slat wall, and the lower clip being engageable with a lower section of the slat wall; and
   a second clip assembly adjustably mounted to the second arm and engageable with the slat wall, the second clip assembly including an upper clip and a lower clip, the upper clip being engageable with the upper section of the slat wall, and the lower clip being engageable with the lower section of the slat wall;
   wherein the channel is so dimensioned that at least one cable of an electrical component supported by the mounting device is insertable through the channel between the main body and the slat wall, at least one of the upper clip or the lower clip of the first clip assembly is adjustable relative to the other one of the upper clip and the lower clip thereof, and at least one of the upper clip or the lower clip of the second clip assembly is adjustable relative, to the other one of the upper clip and the lower clip thereof.

14. The wall mounting assembly of claim 13, wherein:
   the upper clips of the first and second clip assemblies are affixed to the first and second arms, respectively; and
   the lower clips of the first and second clip assemblies are adjustably mounted to the first and second arms, respectively.

15. The wall mounting assembly of claim 13, wherein the first and second clip assemblies each further include an adjustment means for adjustably engaging the lower clips to and from the lower section of the slat wall.

16. The wall mounting assembly of claim 15, wherein the lower clips are independently adjustable.

17. The wall mounting assembly of claim 15, wherein the adjustment means each include a threaded bolt.

18. The wall mounting assembly of claim 17, wherein the main body includes a pair of chambers, and the threaded bolts are received within the chambers.

19. The wall mounting assembly of claim 18, wherein the main body further includes a pair of access points for accessing the threaded bolts.

20. The wall mounting assembly of claim 13, wherein the first and second clip assemblies each include at least one "J" shaped clip.

21. The wall mounting assembly of claim 13, wherein the first and second clip assemblies each include at least one clip that is generally zigzag-shaped.

22. The wall mounting assembly of claim 13, wherein the first and second arms are angled away from the mount.

23. A wall mounting assembly for supporting a mounting device and adapted to engage a slat wall, the wall mounting assembly comprising:
   a main body;
   a mount attached to the main body and adapted to receive the mounting device;
   a first fastening means attached to the main body, the first fastening means for securing the wall mounting assembly to the slat wall, the first fastening means including first and second engaging means; and
   a second fastening means attached to the main body, the second fastening means for securing the wall mounting assembly to the slat wall, the second fastening means including first and second engaging means;
   wherein the second fastening means is spaced apart from the first fastening means, at least one of the first engaging means or the second engaging means of the first fastening means is adjustable relative to the other one of the first engaging means and the second engaging means thereof, and at least one of the first engaging means or the second engaging means of the second fastening means is adjustable relative to the other one of the first engaging means and the second engaging means thereof.

24. The wall mounting assembly of claim 23, wherein the first and second fastening means each include an adjustment means for adjustably coupling to the slat wall.

25. A wall mounting assembly for supporting a mounting device and adapted to engage a slat wall, the wall mounting assembly comprising:
   a main body having a central portion and first and second arms attached to the central portion, the first and second arms being operable to engage the slat wall, the central portion and the first and second arms defining a channel therebetween;
   a mount attached to the central portion and adapted to receive the mounting device;
   a first fastening means associated with the first arm to secure the first arm to the slat wall, the first fastening means including first and second engaging means; and
   a second fastening means associated with the second arm to secure the second arm to the slat wall, the second fastening means including first and second engaging means;
   wherein the channel is so dimensioned that at least one cable of an electrical component supported by the mounting device is insertable through the channel between the main body and the slat wall, at least one of the first engaging means or the second engaging means of the first fastening means is adjustable relative to the other one of the first engaging means and the second engaging means thereof, and at least one of the first engaging means or the second engaging means of the second fastening means is adjustable relative to the other one of the first engaging means and the second engaging means thereof.

26. The wall mounting assembly of claim 25, wherein the first and second fastening means each include an adjustment means for adjustably coupling to the slat wall.

27. A kit of wall mounting assembly components for securing a mounting device to a slat wall, the kit comprising:
   a main body;
   a mount attached to the main body and adapted to receive the mounting device;
   interchangeable sets of first fastening means capable of being attached to the main body, the sets first fastening means each capable of engaging the slat wall, each of the first fastening means sets including first and second engaging means; and
   interchangeable sets of second fastening means capable of being attached to the main body, the sets of second fastening means capable of engaging the slat wall, each of the second fastening means sets including first and second engaging means;
   wherein the sets of first and second fastening means for attaching to the main body can be selected depending on the structure of the slat wall, at least one of the first and second engaging means of the first fastening means is adjustable relative to the other one of the first and second engaging means thereof, and at least one of the first and second engaging means of the second fastening means is adjustable relative to the other one of the first and second engaging means thereof.

28. A kit of wall mounting assembly components for securing a mounting device to a slat wall, the kit comprising:
   a main body;
   a mount attached to the main body, the mount having an opening therein adapted to receive the mounting device;
   a first clip assembly capable of being attached to the main body, the first clip assembly capable of engaging the slat wall, the first clip assembly including an upper clip and a lower clip, the upper clip being engageable with an upper section of the slat wall, and the lower clip being engageable with a lower section of the slat wall; and
   a second clip assembly capable of being attached to the main body, the second clip assembly capable of engaging the slat wall, the second clip assembly including an upper clip and a lower clip, the upper clip being engageable with the upper section of the slat wall, and the lower clip being engageable with the lower section of the slat wall;
   wherein at least one of the upper clip or the lower clip of the first clip assembly is adjustable relative to the other one of the upper clip and the lower clip thereof, and at least one of the upper clip or the lower clip of the second clip assembly is adjustable relative to the other one of the upper clip and the lower clip thereof.

29. The kit of claim 28, further comprising a plurality of interchangeable first and second clip assemblies having fastening means for attaching to the slat wall, wherein the first and second clip assemblies for attaching to the main body can be selected depending on the structure of the slat wall.

30. The kit of claim 28, wherein:
   the upper clips of the first and second clip assemblies are adapted to be fixedly secured to the main body; and
   the lower clips of the first and second clip assemblies are adapted to be adjustably mounted to the main body.

31. The kit of claim 28, wherein the first and second clip assemblies each further include an adjustment means for adjustably engaging the lower clips to and from the lower section of the slat wall.

32. The kit of claim 31, wherein the adjustment means each includes a threaded bolt.

33. The kit of claim 28, wherein the kit further includes interchangeable sets of lower clips and interchangeable sets of upper clips.

34. The kit of claim 33, wherein the interchangeable sets of lower clips include at least a pair of "J" shaped lower clips and the interchangeable sets of upper clips include at least a pair of "J" shaped upper clips.

35. The kit of claim 33, wherein the interchangeable sets of lower clips include at least a pair of generally zigzag-shaped shaped lower clips and the interchangeable sets of upper clips include at least a pair of generally zigzag-shaped upper clips.

* * * * *